(12) United States Patent
Tokizaki et al.

(10) Patent No.: US 10,880,498 B2
(45) Date of Patent: Dec. 29, 2020

(54) IMAGE PROCESSING APPARATUS AND IMAGE PROCESSING METHOD TO IMPROVE QUALITY OF A LOW-QUALITY IMAGE

(71) Applicant: SONY CORPORATION, Tokyo (JP)

(72) Inventors: Yuki Tokizaki, Tokyo (JP); Kazunori Kamio, Kanagawa (JP); Toshiyuki Sasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/482,514

(22) PCT Filed: Feb. 14, 2018

(86) PCT No.: PCT/JP2018/004983
§ 371 (c)(1),
(2) Date: Jul. 31, 2019

(87) PCT Pub. No.: WO2018/163725
PCT Pub. Date: Sep. 13, 2018

(65) Prior Publication Data
US 2020/0053297 A1 Feb. 13, 2020

(30) Foreign Application Priority Data

Mar. 8, 2017 (JP) .................. 2017-043450

(51) Int. Cl.
*H04N 5/33* (2006.01)
*G06T 5/50* (2006.01)

(52) U.S. Cl.
CPC ............... *H04N 5/332* (2013.01); *G06T 5/50* (2013.01); *G06T 2207/10048* (2013.01); *G06T 2207/20221* (2013.01)

(58) Field of Classification Search
CPC ........ H04N 5/332; H04N 5/225; H04N 5/232; H04N 5/33; H04N 7/18; G06T 5/50;
(Continued)

(56) References Cited

U.S. PATENT DOCUMENTS

2015/0373286 A1* 12/2015 Matsuoka ............ G06K 9/3233
348/165

FOREIGN PATENT DOCUMENTS

EP    3229468 A1    10/2017
JP    2008-183933 A    8/2008
(Continued)

OTHER PUBLICATIONS

Office Action for JP Patent Application No. 2019-504411, dated Jun. 10, 2019, 3 pages of Office Action.
(Continued)

*Primary Examiner* — Nam D Pham
(74) *Attorney, Agent, or Firm* — Chip Law Group

(57) ABSTRACT

An image processing apparatus includes a first combination unit that receives a far-infrared image and multiple reference images obtained by capturing the same object as that of the far-infrared image and generates a first composite signal which is a composite signal of the multiple reference images and a second combination unit that combines the far-infrared image and the first composite signal to generate a quality-improved image of the far-infrared image. The first combination unit generates the first composite signal on the basis of a visible image-far-infrared image correlation amount and a near-infrared image-far-infrared image correlation amount. The first combination unit sets a contribution ratio of a reference image, which has a larger amount of correlation with the far-infrared image, of the two reference images, that is, the visible image and the near-infrared image to a large value and generates the first composite signal.

16 Claims, 25 Drawing Sheets

(58) Field of Classification Search
CPC . G06T 2207/10048; G06T 2207/20221; G06T 3/40; G01J 5/48
See application file for complete search history.

(56) References Cited

FOREIGN PATENT DOCUMENTS

| | | |
|---|---|---|
| JP | 2010-278817 A | 12/2010 |
| JP | 2011-211387 A | 10/2011 |
| JP | 2016-005213 A | 1/2016 |
| WO | 2016/113983 A1 | 7/2016 |

OTHER PUBLICATIONS

International Search Report and Written Opinion of PCT Application No. PCT/JP2018/004983, dated Apr. 10, 2018, 06 pages of ISRWO.

* cited by examiner

FIG. 2A
Visible image

FIG. 2B
Far-infrared image

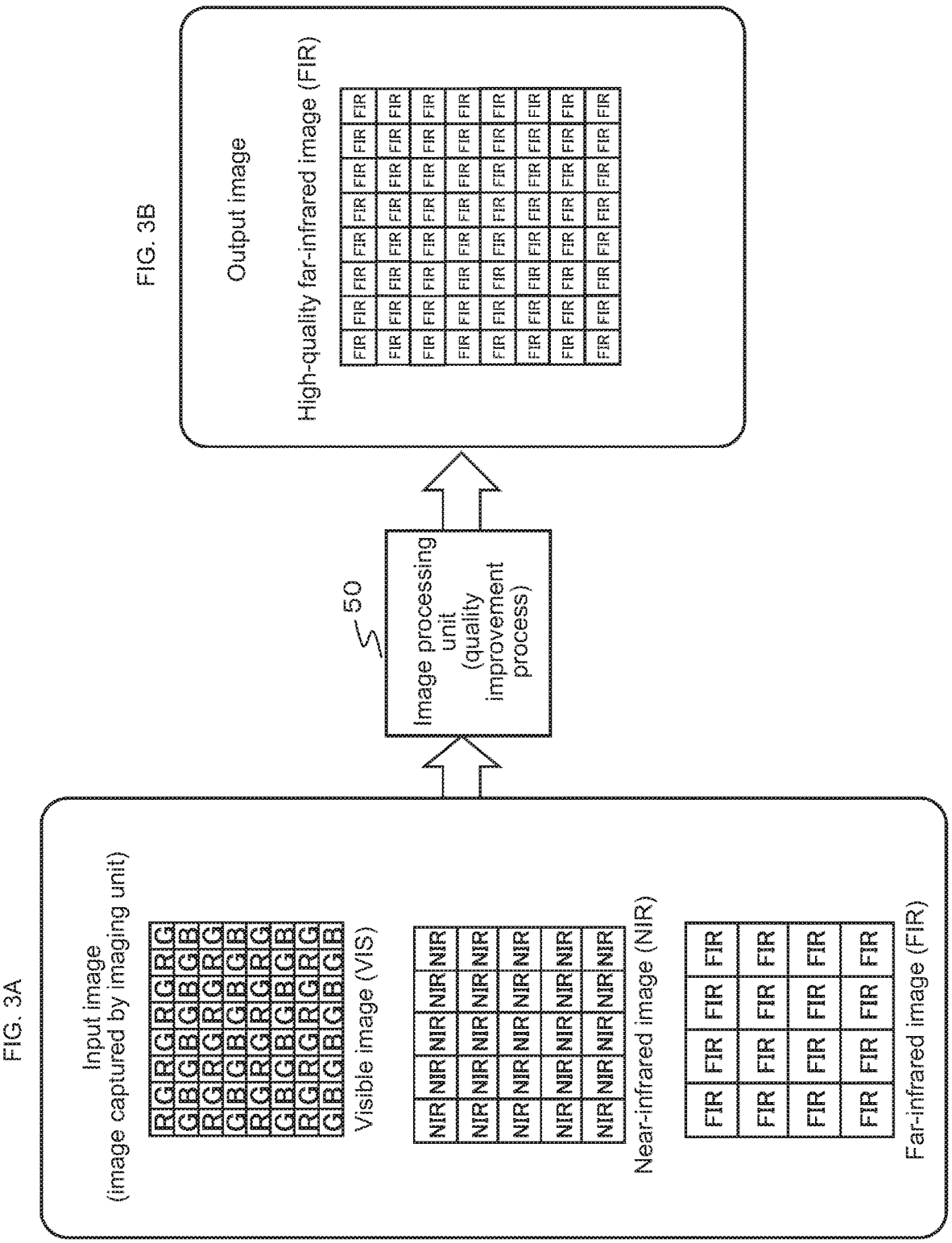

| | Image characteristics | Visible image (VIS) | Near-infrared image (NIR) | Far-infrared image (FIR) |
|---|---|---|---|---|
| (1) | Whether temperature information can be acquired | × | × | ○ |
| (2) | Whether object information can be acquired in dark environment | × | ○ | ○ |
| (3) | Whether object information can be acquired in bright environment | ○ | ○ | ○ |
| (4) | Whether object information can be acquired in distant view | ○ | × | ○ |
| (5) | Whether object information can be acquired in near view | ○ | ○ | ○ |
| (6) | Whether pattern information of, for example, printed matter can be acquired | ○ | × | × |
| (7) | Whether high-resolution image can be acquired | ○ | ○ | × |

FIG.15

| | Image characteristics | Visible image (VIS) | Short-wave infrared image (SWIR) | Far-infrared image (FIR) |
|---|---|---|---|---|
| (1) | Whether temperature information can be acquired | × | × | ○ |
| (2) | Whether object information can be acquired in dark environment | × | ○ | ○ |
| (3) | Whether object information can be acquired in bright environment | ○ | ○ | ○ |
| (4) | Whether object information can be acquired in distant view | ○ | ○ | ○ |
| (5) | Whether object information can be acquired in near view | ○ | ○ | ○ |
| (6) | Whether pattern information of, for example, printed matter can be acquired | ○ | × | × |
| (7) | Whether high-resolution image can be acquired | ○ | ○ | × |

FIG.22

IMAGE PROCESSING APPARATUS AND IMAGE PROCESSING METHOD TO IMPROVE QUALITY OF A LOW-QUALITY IMAGE

CROSS REFERENCE TO RELATED APPLICATIONS

This application is a U.S. National Phase of International Patent Application No. PCT/JP2018/004983 filed on Feb. 14, 2018, which claims priority benefit of Japanese Patent Application No. JP 2017-043450 filed in the Japan Patent Office on Mar. 8, 2017. Each of the above-referenced applications is hereby incorporated herein by reference in its entirety.

TECHNICAL FIELD

The present disclosure relates to an image processing apparatus, an image processing method, and a program. More particularly, the present disclosure relates to an image processing apparatus, an image processing method, and a program that perform a process of improving the quality of a low-quality image such as a far-infrared image.

BACKGROUND ART

In recent years, a system has been widely used in which a visible camera that captures a visible image and a far-infrared camera that can capture, for example, an image of a person even at night when it is difficult to capture images with visible light are combined.

An imaging apparatus using two cameras is disclosed in, for example, Patent Literature 1 (JP-A-2011-211387) or Patent Literature 2 (JP-A-2008-183933).

However, in general, an infrared camera has a problem that it has a lower resolution than a visible camera which captures images with visible light.

CITATION LIST

Patent Literature

Patent Literature 1: JP-A-2011-211387
Patent Literature 2: JP-A-2008-183933

DISCLOSURE OF INVENTION

Technical Problem

The present disclosure has been made in view of, for example, the above-mentioned problems and an object of an embodiment of the present disclosure is to provide an image processing apparatus, an image processing method, and a program that improve the quality of, for example, a far-infrared image which is an image captured by a far-infrared camera.

Solution to Problem

In accordance with a first aspect of the present disclosure, there is provided an image processing apparatus including: a first combination unit that receives a far-infrared image and multiple reference images obtained by capturing the same object as that of the far-infrared image and generates a first composite signal which is a composite signal of the multiple reference images; and a second combination unit that performs a process of combining the far-infrared image and the first composite signal to generate a quality-improved image of the far-infrared image.

In accordance with a second aspect of the present disclosure, there is provided an image processing method performed in an image processing apparatus. The image processing method includes: a step of inputting a far-infrared image and multiple reference images obtained by capturing the same object as that of the far-infrared image; a first composite signal generation step of allowing a first combination unit to generate a first composite signal which is a composite signal of the multiple reference images; and a step of allowing a second combination unit to perform a process of combining the far-infrared image and the first composite signal to generate a quality-improved image of the far-infrared image.

In accordance with a third aspect of the present disclosure, there is provided a program that causes an image processing apparatus to perform image processing and to perform: a step of inputting a far-infrared image and multiple reference images obtained by capturing the same object as that of the far-infrared image; a first composite signal generation step of allowing a first combination unit to generate a first composite signal which is a composite signal of the multiple reference images; and a step of allowing a second combination unit to perform a process of combining the far-infrared image and the first composite signal to generate a quality-improved image of the far-infrared image.

Note that, for example, the program according to the present disclosure can be provided by a storage medium or a communication medium which is provided in a computer-readable form to an information processing apparatus or a computer system capable of executing various program codes. Since the program is provided in a computer readable form, processes corresponding to the program are implemented in the information processing apparatus or the computer system.

Other objects, features, and advantages of the present disclosure will become apparent from the more detailed description based on the embodiments of the present disclosure which will be described below and the accompanying drawings. Note that, in the specification, a system is a logical set configuration of multiple apparatuses and is not limited to the configuration in which the apparatuses are provided in the same housing.

Advantageous Effects of Invention

An apparatus and a method that perform a process of improving the quality of a far-infrared image are achieved by the configuration of an embodiment of the present disclosure.

Specifically, an image processing apparatus includes, for example, a first combination unit that receives a far-infrared image and multiple reference images obtained by capturing the same object as that of the far-infrared image and generates a first composite signal which is a composite signal of the multiple reference images and a second combination unit that performs a process of combining the far-infrared image and the first composite signal to generate a quality-improved image of the far-infrared image. The reference images are, for example, a visible image and a near-infrared image. The first combination unit generates the first composite signal on the basis of a visible image-far-infrared image correlation amount and a near-infrared image-far-infrared image correlation amount. The first combination unit sets a contribution ratio of a reference image, which has a larger amount of correlation with the far-infrared image, of the two reference images, that is, the visible image and the near-infrared image to a large value and generates the first composite signal.

An apparatus and a method that perform a process of improving the quality of a far-infrared image are achieved by these processes.

Note that the effects described in the specification are just illustrative and are not limited and additional effects may be obtained.

BRIEF DESCRIPTION OF DRAWINGS

FIGS. 2A and 2B are diagrams illustrating an example of the arrangement of pixels in a visible image and an infrared image.

FIGS. 3A and 3B are diagrams illustrating a process performed by an image processing apparatus according to the present disclosure.

FIG. 15 is a diagram illustrating the characteristics of various images.

FIG. 22 is a diagram illustrating the characteristics of various images.

MODE(S) FOR CARRYING OUT THE INVENTION

Hereinafter, an image processing apparatus, an image processing method, and a program according to the present disclosure will be described in detail with reference to the drawings. Note that the description will be made in accordance with the following items.

1. For Configuration and Process of Image Processing Apparatus According to Present Disclosure
2. For Image Processing Apparatus Performing Far-infrared Image Quality Improvement Process
3. For Process Sequence Performed by Image Processing Apparatus
4. For Characteristics of Far-infrared Image, Visible Image, and Near-infrared Image and Availability of Quality-improved Image of Far-infrared Image
5. (Embodiment 2) For Embodiment Using Short-wave Infrared Image
6. For Process Sequence Performed by Image Processing Apparatus Performing According to Second Embodiment
7. For Characteristics of Far-infrared Image, Visible Image, and Short-wave Infrared Image and Availability of Quality-improved Image of Far-infrared Image
8. For Example of Hardware Configuration of Image Processing Apparatus
9. For Application Examples of Image Processing Apparatus According to Present Disclosure
10. Summary of Configuration of Present Disclosure

1. For Configuration and Process of Image Processing Apparatus According to Present Disclosure The configuration and process of an image processing apparatus according to the present disclosure will be described with reference to FIG. 1 and the subsequent figures.

First, an image to be processed by the image processing apparatus according to the present disclosure will be described with reference to FIG. 1 and the subsequent figures.

The image processing apparatus according to the present disclosure receives, for example, a low-resolution far-infrared image (FIR: Far IneraRed) and a high-resolution image obtained by capturing the same object as a reference image and performs image processing using the reference image to generate a high-quality far-infrared image (FIR: Far IneraRed), for example, a high-resolution far-infrared image (FIR: Far IneraRed).

Specifically, the image processing apparatus receives, for example, the following images:
(a) A visible image (VIS: Visible);
(b) A near-infrared image (NIR: Near IneraRed); and
(c) A far-infrared image (FIR: Far IneraRed).

Then, the image processing apparatus performs image processing using these images to generate a high-quality far-infrared image (FIR).

Alternatively, the image processing apparatus receives, for example, the following images:
(a) A visible image (VIS: Visible);
(b) A short-wave infrared image (SWIR: Short Wave IneraRed); and
(c) A far-infrared image (FIR: Far IneraRed).

Then, the image processing apparatus performs image processing using these images to generate a high-quality far-infrared image (FIR).

Figure 1:
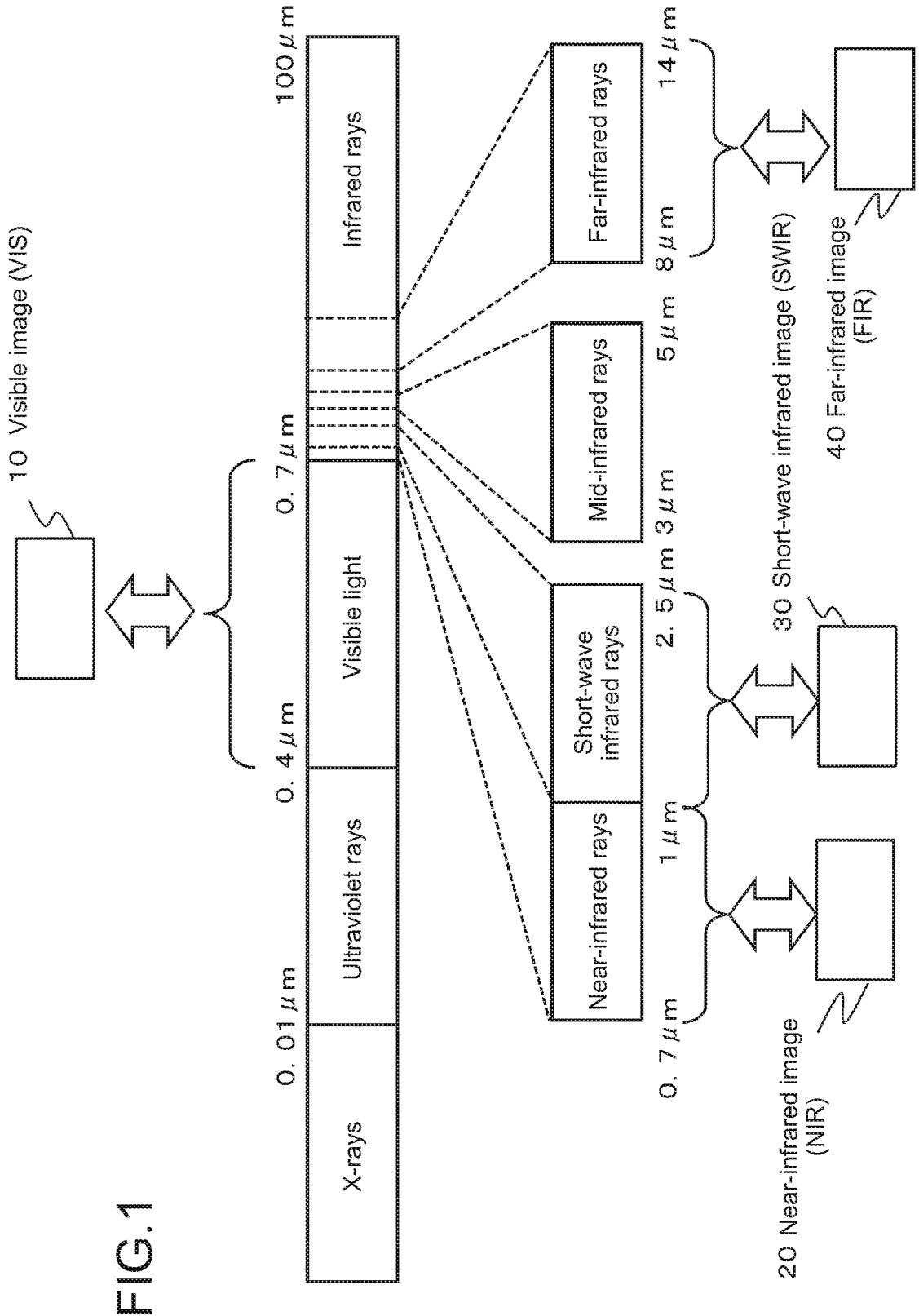
FIG. 1 is a diagram illustrating a correspondence relationship between the type of captured image and the wavelength of light.

As illustrated in FIG. 1, a visible image (VIS) 10 is an image in a wavelength range of about 0.4 µm to 0.7 µm and is a color image such as an RGB image captured by a general camera.

In contrast, the far-infrared image is an image formed by long-wavelength light with a wavelength of 0.7 µm or more. An infrared imaging camera that captures infrared images can capture, for example, an image of a person that generates heat in the dark and is used as, for example, a surveillance camera.

Note that infrared rays are divided into near-infrared rays (NIR) with a wavelength of about 0.7 µm to 1 µm, short-wave infrared rays (SWIR) with a wavelength of about 1 µm to 2.5 µm, mid-infrared rays with a wavelength of about 3 µm to 5 µm, and far-infrared rays (FIR) with a wavelength of about 8 µm to 14 µm as illustrated in FIG. 1.

An image captured by a near-infrared camera is a near-infrared image (NIR) 20 with a wavelength of about 0.7 µm to 1 µm.

An image captured by a short-wave infrared camera is a near-infrared image (NIR) 30 with a wavelength of about 1 µm to 2.5 µm.

In addition, an image captured by a far-infrared camera is a far-infrared image (FIR) 40 with a wavelength of about 8 µm to 14 µm.

In the embodiments which will be described below, an example of image processing for improving the quality of the far-infrared image 40 obtained by mainly capturing far-infrared rays with a wavelength of about 8 µm to 14 µm will be described.

However, the application of the process according to the present disclosure is not limited to the far-infrared image and the process can be applied to a quality improvement process for other infrared images, various low-quality images, such as fluorescent images, and low-resolution images.

Figures 2A, 2B:
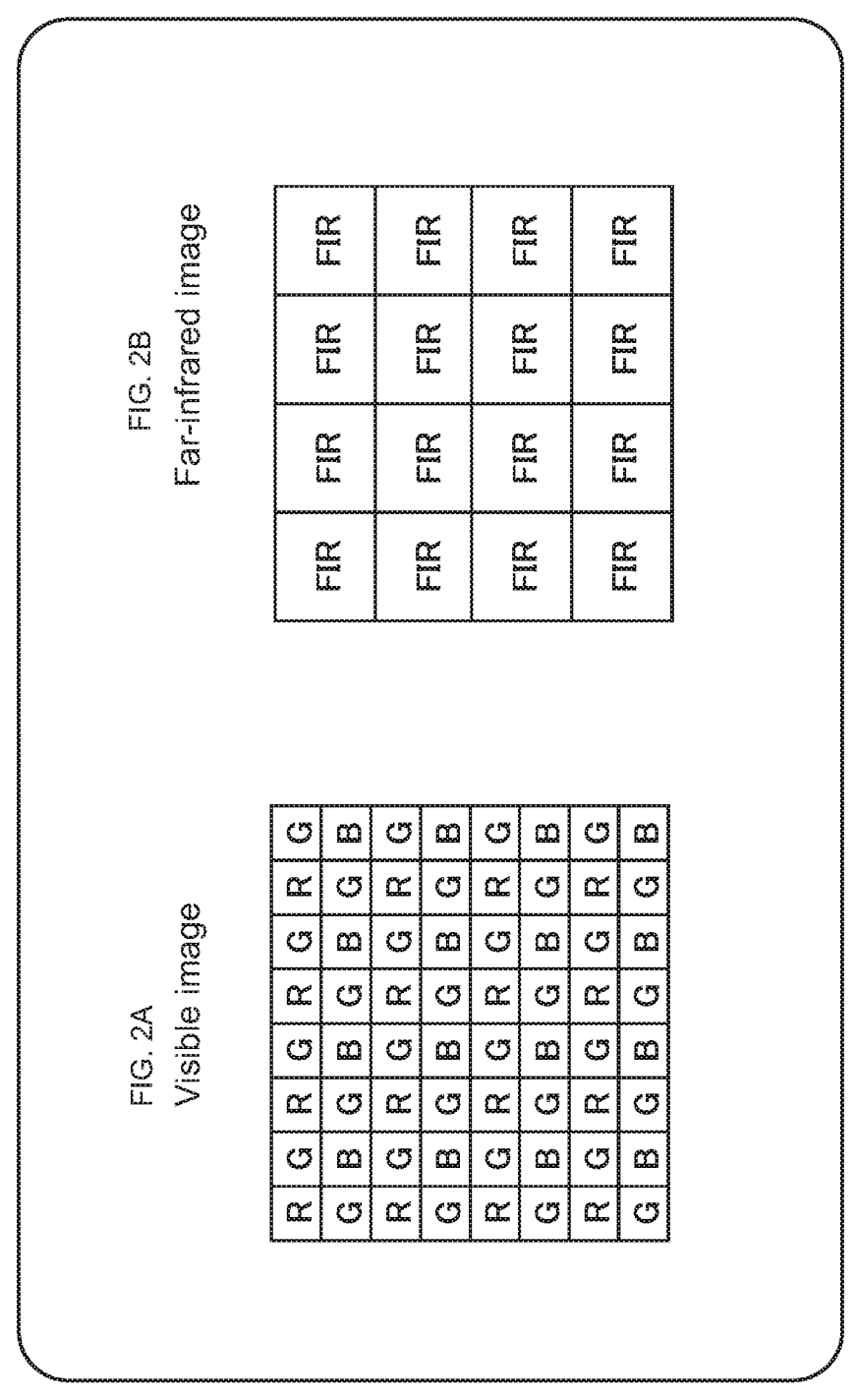

FIGS. 2A and 2B are diagrams illustrating an example of the arrangement of pixels on an imaging element that captures the visible image 10 and the far-infrared image 40.

The visible image illustrated in FIG. 2A shows an example of a Bayer array of R, G, and B pixels. The Bayer array is used for imaging elements of many visible imaging cameras.

Each pixel of the imaging element outputs an electric signal corresponding to the amount of light with each of R, G, and B wavelengths.

In contrast, the far-infrared image illustrated in FIG. 2B is obtained by capturing light with a far-infrared (FIR: Far InfraRed) wavelength at all pixel positions.

However, as illustrated in FIG. 2A and FIG. 2B, in general, an infrared imaging element, such as a far-infrared imaging element, has a lower resolution than a visible imaging element. The reason is that infrared rays, particularly, far-infrared rays have a long wavelength and it is difficult for an imaging element having a high-density pixel array to use the infrared rays.

An example of the process performed by the image processing apparatus according to the present disclosure will be described with reference to FIGS. 3A and 3B. For example, the image processing apparatus according to the present disclosure performs image processing for a low-resolution far-infrared image to generate a high-resolution far-infrared image.

As illustrated in FIGS. 3A and 3B, an image processing unit 50 of the image processing apparatus according to the present disclosure receives, as FIG. 3A images captured by an imaging unit, the following three types of images:
(a) A visible image (VIS);
(b) A near-infrared image (NIR); and
(c) A far-infrared image (FIR).

Alternatively, the image processing unit 50 receives the following three types of images:
(a) A visible image (VIS);
(b) A short-wave infrared image (SWIR); and
(c) A far-infrared image (FIR).

The image processing unit 50 performs a process of improving the quality of a low-resolution far-infrared image with the three input images to generate a quality-improved image illustrated in FIG. 3B, that is, a high-resolution far-infrared image, and outputs the high-resolution far-infrared image.

That is, the image to be corrected which is to be subjected to the quality improvement process is a far-infrared image.

A visible image and a near-infrared image, or a visible image and a short-wave infrared image are used as the reference images for the image correction process.

Next, the specific configuration and process of the image processing apparatus performing the above-mentioned image processing will be described.

2. For Image Processing Apparatus Performing Far-Infrared Image Quality Improvement Process FIG. 4 is a block diagram illustrating the configuration of an imaging apparatus which is an example of an image processing apparatus 100 according to the present disclosure.

Note that the image processing apparatus according to the present disclosure is not limited to the imaging apparatus and includes, for example, an information processing apparatus such as a PC that receives an image captured by the imaging apparatus and performs image processing.

Hereinafter, the configuration and process of the imaging apparatus as an example of the image processing apparatus 100 according to the present disclosure will be described.

Figure 4:
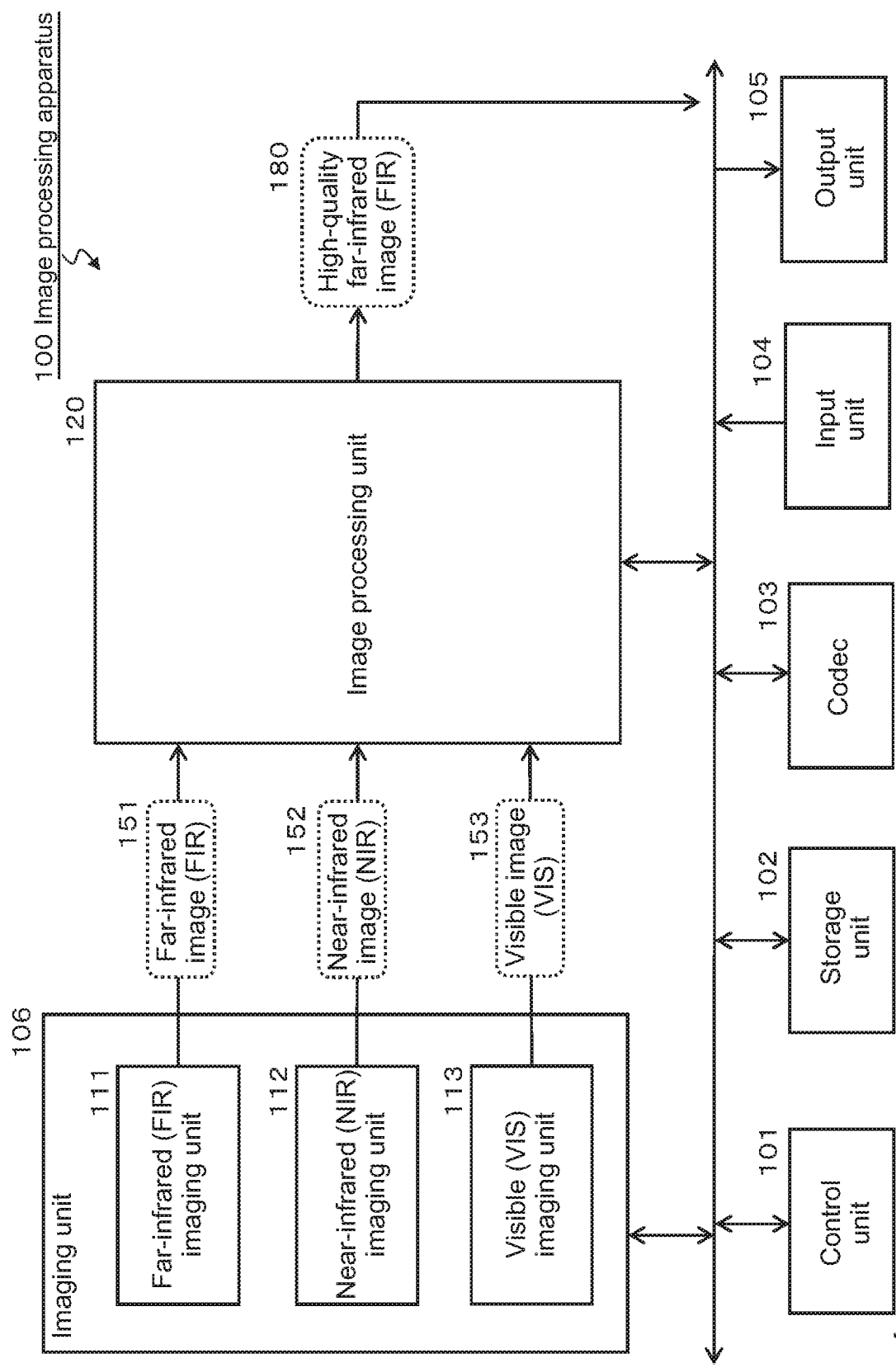
FIG. 4 is a diagram illustrating an example of the configuration of the image processing apparatus.

The image processing apparatus 100 as the imaging apparatus illustrated in FIG. 4 includes a control unit 101, a storage unit 102, a codec 103, an input unit 104, an output unit 105, an imaging unit 106, and an image processing unit 120.

The imaging unit 106 includes a far-infrared imaging unit 111 that captures far-infrared images, a near-infrared imaging unit 112 that captures near-infrared images, and a visible imaging unit 113 that captures general visible images.

For example, the far-infrared imaging unit 111 captures images, using an imaging element including the pixels on which far-infrared rays are incident, which have been described with reference to FIG. 2B, and outputs an electric signal corresponding to the amount of incident far-infrared rays from each pixel.

The near-infrared imaging unit 112 captures images using an imaging element including the pixels on which near-infrared rays are incident and outputs an electric signal corresponding to the amount of incident near-infrared rays from each pixel.

For example, the visible imaging unit 113 is an imaging element that includes R, G, and B pixels arranged in the Bayer array described with reference to FIG. 2A and each pixel outputs a signal corresponding to the amount of input light of each of R, G, and B.

The far-infrared imaging unit 111, the near-infrared imaging unit 112, and the visible imaging unit 113 are provided in two imaging units set at positions that are a predetermined distance away from each other and capture images from different viewpoints.

The same object image is not captured by the corresponding pixels, that is, the pixels at the same position in two images captured from different viewpoints and object deviation corresponding to disparity occurs.

In a case in which the captured images are still images, each of the far-infrared imaging unit 111, the near-infrared imaging unit 112, and the visible imaging unit 113 captures one still image. That is, a total of three still images are captured. In a case in which a moving image is captured, each of the imaging units captures continuous image frames.

Note that the control unit 101 controls the imaging timing of the imaging units.

The control unit 101 controls various processes of the imaging apparatus 100, such as an imaging process, signal processing for a captured image, an image recording process, and a display process. The control unit 101 includes, for example, a CPU that performs processes according to various processing programs stored in the storage unit 102 and functions as a data processing unit that executes programs.

The storage unit 102 is, for example, a RAM or a ROM that functions as a captured image storage unit, a storage unit storing processing programs executed by the control unit 101 or various parameters, and a work area at the time of data processing.

The codec 103 performs a coding and decoding process such as a process of compressing and decompressing a captured image.

The input unit 104 is, for example, a user operation unit and is used to input control information such as information related to the start and end of imaging and the setting of various modes.

For example, the output unit 105 includes a display unit and a speaker and is used to display captured images and through images and to output voice.

The image processing unit 120 receives three images input from the imaging unit 106 and performs a process of improving the quality of the input images using the three images.

Specifically, for example, the image processing unit 120 generates a high-quality far-infrared image (FIR) 180 whose quality has been improved.

The configuration and process of the image processing unit 120 will be described with reference to FIG. 5 and the subsequent figures.

In this embodiment, the image processing unit 120 receives three types of images, that is, a far-infrared image (FIR) 151 captured by the far-infrared imaging unit 111, a near-infrared image (NIR) 152 captured by the near-infrared imaging unit 112, and a visible image (VIS) 153 captured by the visible imaging unit 113, performs the quality improvement process using the three types of images to generate the high-quality far-infrared image (FIR) 180, and outputs the high-quality far-infrared image (FIR) 180.

As described above, the image to be corrected which is to be subjected to the quality improvement process is a far-infrared image.

A visible image and a near-infrared image are used as the reference images for the image correction process.

The process performed by the image processing unit 120 will be described.

First, the image processing unit 120 inputs three types of images, that is, the far-infrared image (FIR) 151 captured by the far-infrared imaging unit 111, the near-infrared image (NIR) 152 captured by the near-infrared imaging unit 112, and the visible image (VIS) 153 captured by the visible imaging unit 113 to an image positioning unit 201.

The image positioning unit 201 performs an image positioning process for the three types of images such that the same object is located at the same position.

Note that the image positioning is performed by the existing process, for example, a process using the amount of disparity of each image or a motion vector.

Note that, in a case in which the three types of images have different sizes, desirably, a scaling process which adjusts the sizes of the images to be equal to each other is performed in advance and then the image positioning process is performed.

Among the images positioned by the image positioning unit 201, the near-infrared image 152 and the visible image 153 which are the reference images are input to low-pass filters (LPFs) 202a and 202b.

The low-pass filters (LPFs) 202a and 202b perform a resolution adjustment process that reduces the resolution level of the near-infrared image 152 and the visible image 153 which are the reference images to the resolution level of the far-infrared image 151 which is the image to be corrected.

The resolution adjustment process is a process for accurately performing the calculation of the amount of correlation in correlation amount calculation units 203a and 203b.

As described with reference to FIGS. 2A, 2B, 3A, and 3B, the resolution of the far-infrared image is lower than that of the visible image or the near-infrared image.

The correlation amount calculation units 203a and 203b calculate the amount of correlation between the far-infrared image which is the image to be corrected and the reference images (the visible image and the near-infrared image), which will be described in detail below.

In the correlation amount calculation process, in a case in which the resolutions of the images to be compared with each other are different, it is difficult to accurately calculate the amount of correlation. The resolutions of the images to be compared with each other are adjusted to the same value in order to accurately calculate the amount of correlation.

The process using the low-pass filters (LPFs) 202a and 202b is performed as follows.

That is, the process using the low-pass filters (LPFs) 202a and 202b is a process for bring the resolution of the near-infrared image 152 and the visible image 153 which are the reference images close to the resolution level of the far-infrared image 151.

A specific example of the process of reducing the resolution levels of the near-infrared image 152 and the visible image 153 in the low-pass filters (LPFs) 202a and 202b will be described with reference to FIG. 6.

Figure 6:
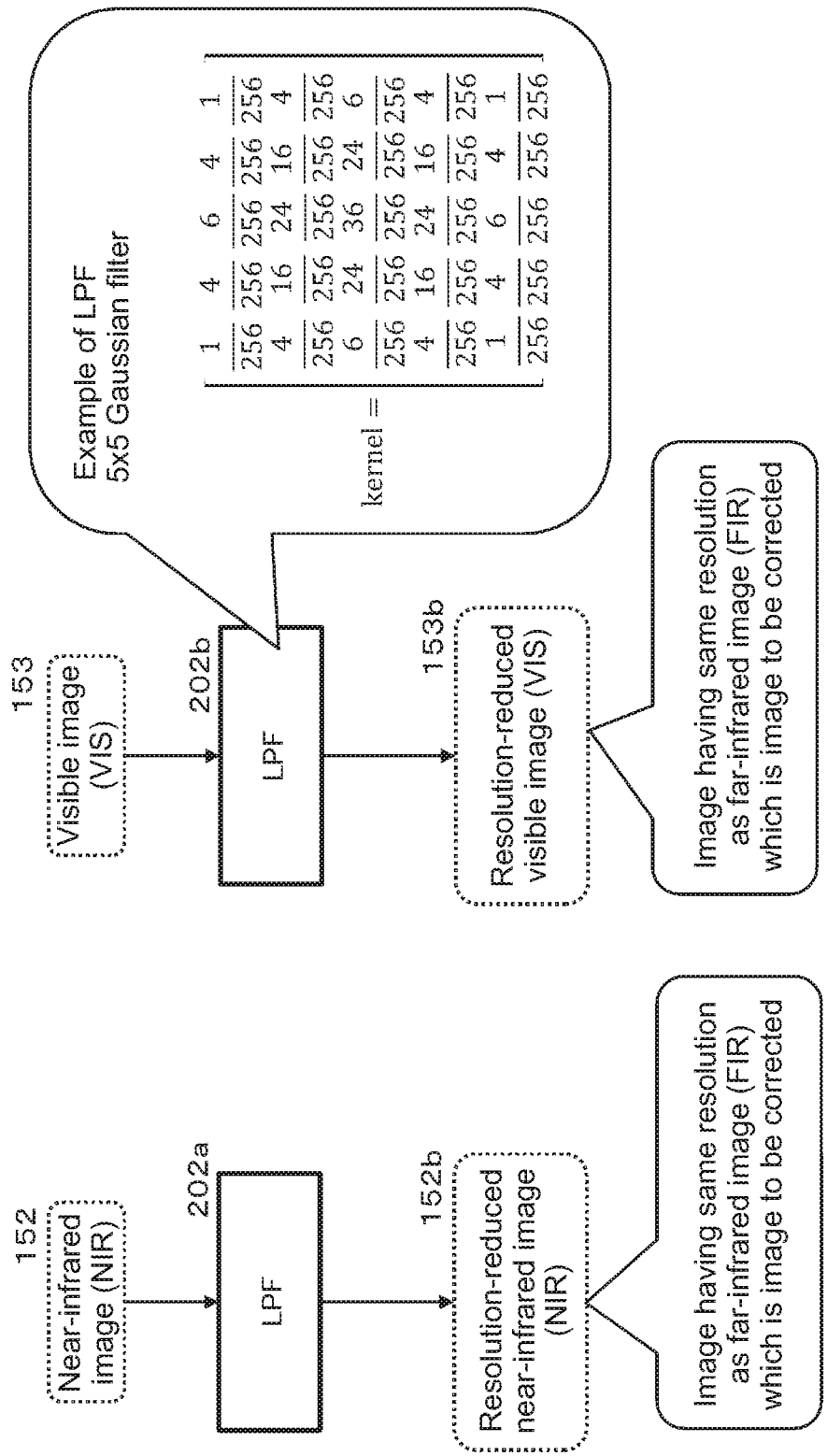
FIG. 6 is a diagram illustrating a process performed by a low-pass filter (LPF).

FIG. 6 illustrates the process of the low-pass filters (LPFs) 202a and 202b.

The low-pass filter (LPF) 202a receives the near-infrared image 152. A process using an LPF is performed to generate a resolution-reduced image, that is, a resolution-reduced near-infrared image 152b and the resolution-reduced near-infrared image 152b is output.

In addition, the low-pass filter (LPF) 202B receives the visible image 153. A process using an LPF is performed to generate a resolution-reduced image, that is, a resolution-reduced visible image 153b and the resolution-reduced visible image 153b is output.

Note that an optimum LPF is applied as the low-pass filter (LPF) in order to reduce the resolution of each image to a target resolution, that is, the resolution of the far-infrared image 151 which is the image to be corrected.

As a specific example, a 5×5 Gaussian filter having coefficients illustrated in FIG. 6 can be applied.

As such, the low-pass filters (LPFs) 202a and 202b perform the resolution adjustment process that reduces the resolution level of the near-infrared image 152 and the visible image 153 which are the reference images to the resolution level of the far-infrared image 151 which is the image to be corrected.

Figure 5:
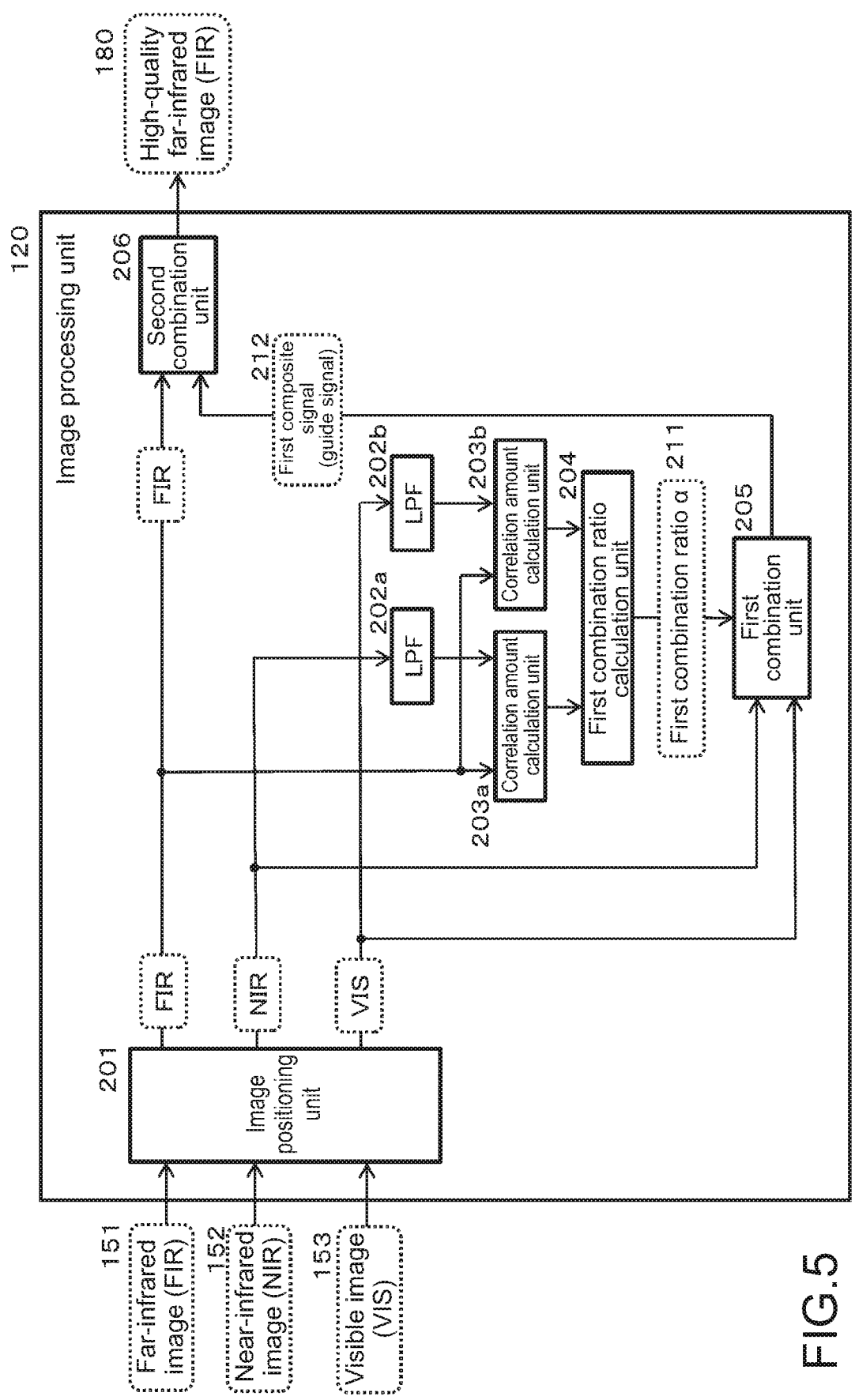
FIG. 5 is a diagram illustrating the configuration and process of an image processing unit.

As illustrated in FIG. 5, the processing results of the low-pass filters (LPF) 202a and 202b are input to the correlation amount calculation units 203a and 203b.

As illustrated in FIG. 5, the near-infrared image 152 subjected to the resolution reduction process and the far-infrared image 151 which is the image to be corrected are input to the correlation amount calculation unit 203a.

In addition, the visible image 153 subjected to the resolution reduction process and the far-infrared image 151 which is the image to be corrected are input to the correlation amount calculation unit 203b.

The processes performed by the correlation amount calculation units 203a and 203b will be described with reference to FIGS. 7 and 8.

Figure 7:
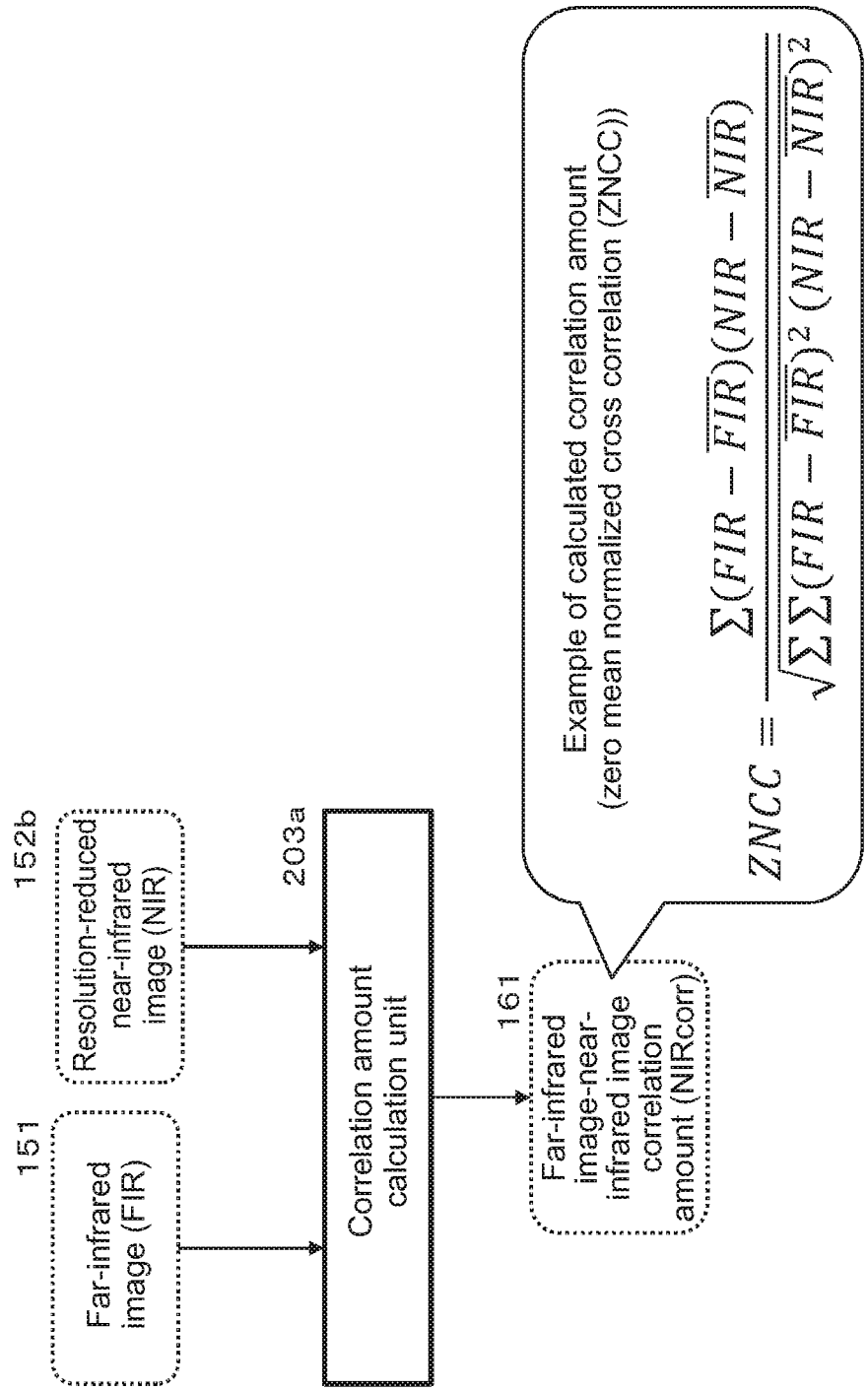
FIG. 7 is a diagram illustrating a process performed by a correlation amount calculation unit.

FIG. 7 is a diagram illustrating the process of the correlation amount calculation unit 203a.

As illustrated in FIG. 7, the far-infrared image 151 which is the image to be corrected and the resolution-reduced near-infrared image 152b which is the reference image and whose resolution has been reduced to almost the same resolution as that of the far-infrared image 151 by the resolution reduction process are input to the correlation amount calculation unit 203a.

The correlation amount calculation unit 203a calculates the amount of correlation between the two input images.

Note that various existing techniques can be used as the image correlation amount calculation process.

FIG. 7 illustrates an example in which zero mean normalized cross correlation (ZNCC) calculated by the following (Expression 1) is applied as the amount of correlation.

[Math. 1]

$$ZNCC = \frac{\sum (FIR - \overline{FIR})(NIR - \overline{NIR})}{\sqrt{\sum\sum (FIR - \overline{FIR})^2 (NIR - \overline{NIR})^2}} \quad \text{(Expression 1)}$$

Note that, in the above-mentioned (Expression 1), FIR is a pixel value (brightness value) of the far-infrared image, NIR is a pixel value (brightness value) of the near-infrared image, FIR with a bar set at the top is an average value of the pixel values (brightness values) of a far-infrared image of a local region (for example, 7×7 pixels) whose correlation is to be calculated, and NIR with a bar set at the top is an average value of the pixel values (brightness values) of a near-infrared image of a local region (for example, 7×7 pixels) whose correlation is to be calculated.

For example, ZNCC calculated by the above-mentioned (Expression 1) is calculated as the amount of correlation for each predetermined local region (for example, 7×7 pixels) in two input images (the far-infrared image and the near-infrared image).

The calculation result is a far-infrared image-near-infrared image correlation amount (NIRcorr) 161 illustrated as the output of the correlation amount calculation unit 203a illustrated in FIG. 7.

Figure 8:
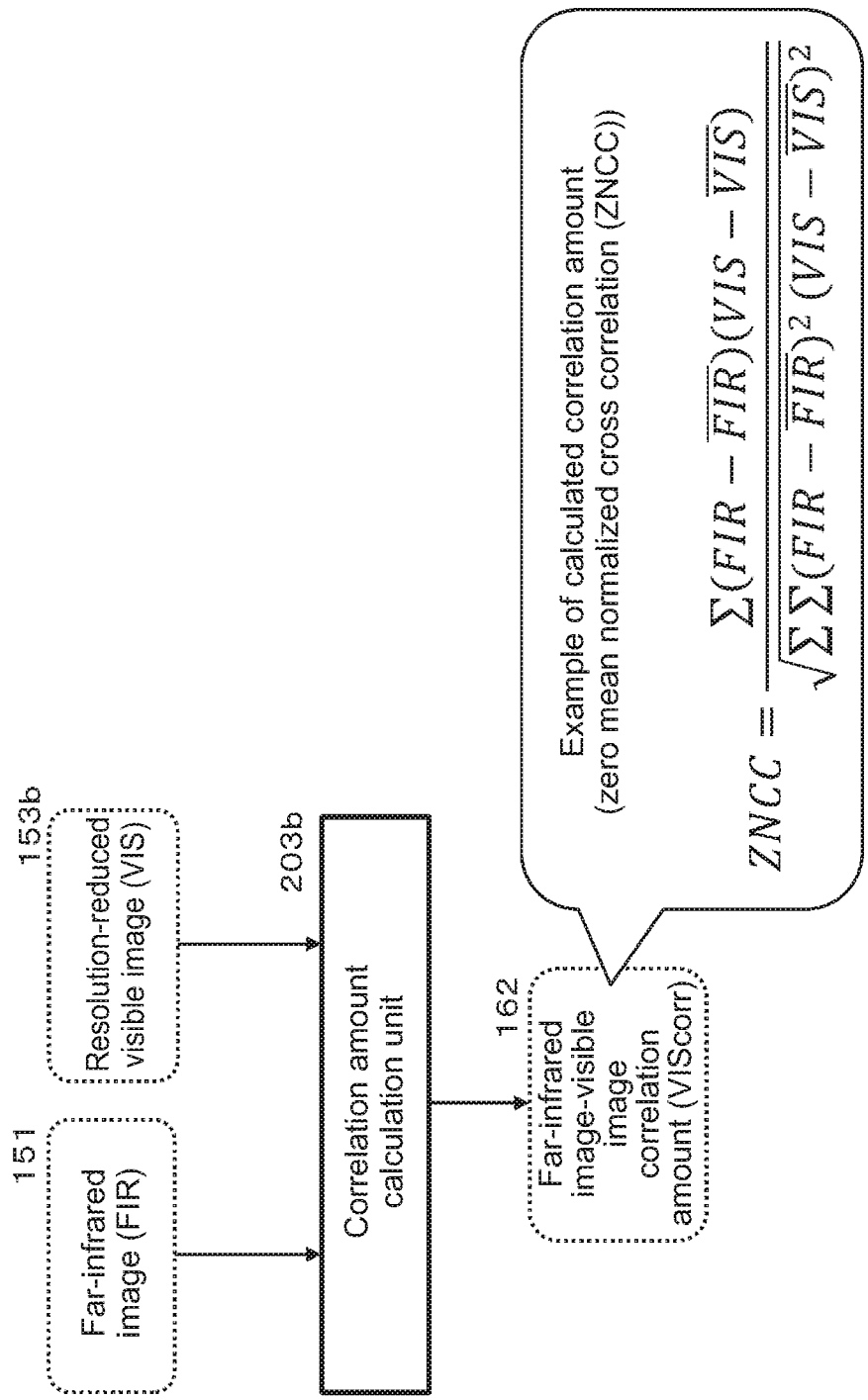
FIG. 8 is a diagram illustrating a process performed by a correlation amount calculation unit.

FIG. 8 is a diagram illustrating the process of the correlation amount calculation unit 203b.

As illustrated in FIG. 8, the far-infrared image 151 which is the image to be corrected and the resolution-reduced visible image 153b which is the reference image and whose resolution has been reduced to almost the same resolution as that of the far-infrared image 151 by the resolution reduction process are input to the correlation amount calculation unit 203b.

The correlation amount calculation unit 203b calculates the amount of correlation between the two input images.

FIG. 8 illustrates an example in which zero mean normalized cross correlation (ZNCC) calculated by the following (Expression 2) is applied as the amount of correlation.

[Math. 2]

$$ZNCC = \frac{\sum (FIR - \overline{FIR})(VIS - \overline{VIS})}{\sqrt{\sum\sum (FIR - \overline{FIR})^2 (VIS - \overline{VIS})^2}} \quad \text{(Expression 2)}$$

Note that, in the above-mentioned (Expression 2), FIR is a pixel value (brightness value) of the far-infrared image, VIS is a pixel value (brightness value) of the visible image, FIR with a bar set at the top is an average value of the pixel values (brightness values) of a far-infrared image of a local region (for example, 7×7 pixels) whose correlation is to be calculated, and VIS with a bar set at the top is an average value of the pixel values (brightness values) of a visible image of a local region (for example, 7×7 pixels) whose correlation is to be calculated.

For example, ZNCC calculated by the above-mentioned (Expression 2) is calculated as the amount of correlation for each predetermined local region (for example, 7×7 pixels) in two input images (the far-infrared image and the visible image).

The calculation result is a far-infrared image-visible image correlation amount (VIScorr) 162 illustrated as the output of the correlation amount calculation unit 203b illustrated in FIG. 8.

As such, the correlation amount calculation unit 203a calculates the far-infrared image-near-infrared image correlation amount (NIRcorr) 161 and outputs the calculated value to a first combination ratio calculation unit 204.

In addition, the correlation amount calculation unit 203b calculates the far-infrared image-visible image correlation amount (VIScorr) 162 and outputs the calculated value to the first combination ratio calculation unit 204.

Next, the process performed by the first combination ratio calculation unit 204 will be described.

As illustrated in FIG. 5, the first combination ratio calculation unit 204 receives the two amounts of correlation from the correlation amount calculation units 203a and 203b, generates a first combination ratio α 211, and outputs the first combination ratio α 211 to a first combination unit 205.

The first combination unit 205 performs a process of combining the near-infrared image 152 and the visible image 153 which are the reference images and outputs a first composite signal (guide signal) 212 which is a composite image of the near-infrared image 152 and the visible image 153 to a second combination unit 206.

The first combination ratio calculation unit 204 performs a process of calculating an image combination ratio α to be applied to the combination of the near-infrared image 152 and the visible image 153 in the first combination unit 205.

Note that the first combination ratio α is a near-infrared image combination ratio used in the combination of the near-infrared image and the visible image in the first combination unit 205 and has the value of 0≤α≤1.

The first combination unit 205 performs an image combination process using the near-infrared image (NIR) with a combination ratio α and the visible image (VIS) with a combination ratio (1−α).

This process will be described in detail below.

A specific example of the process performed by the first combination ratio calculation unit 204 will be described with reference to FIGS. 9 and 10.

Figure 9:
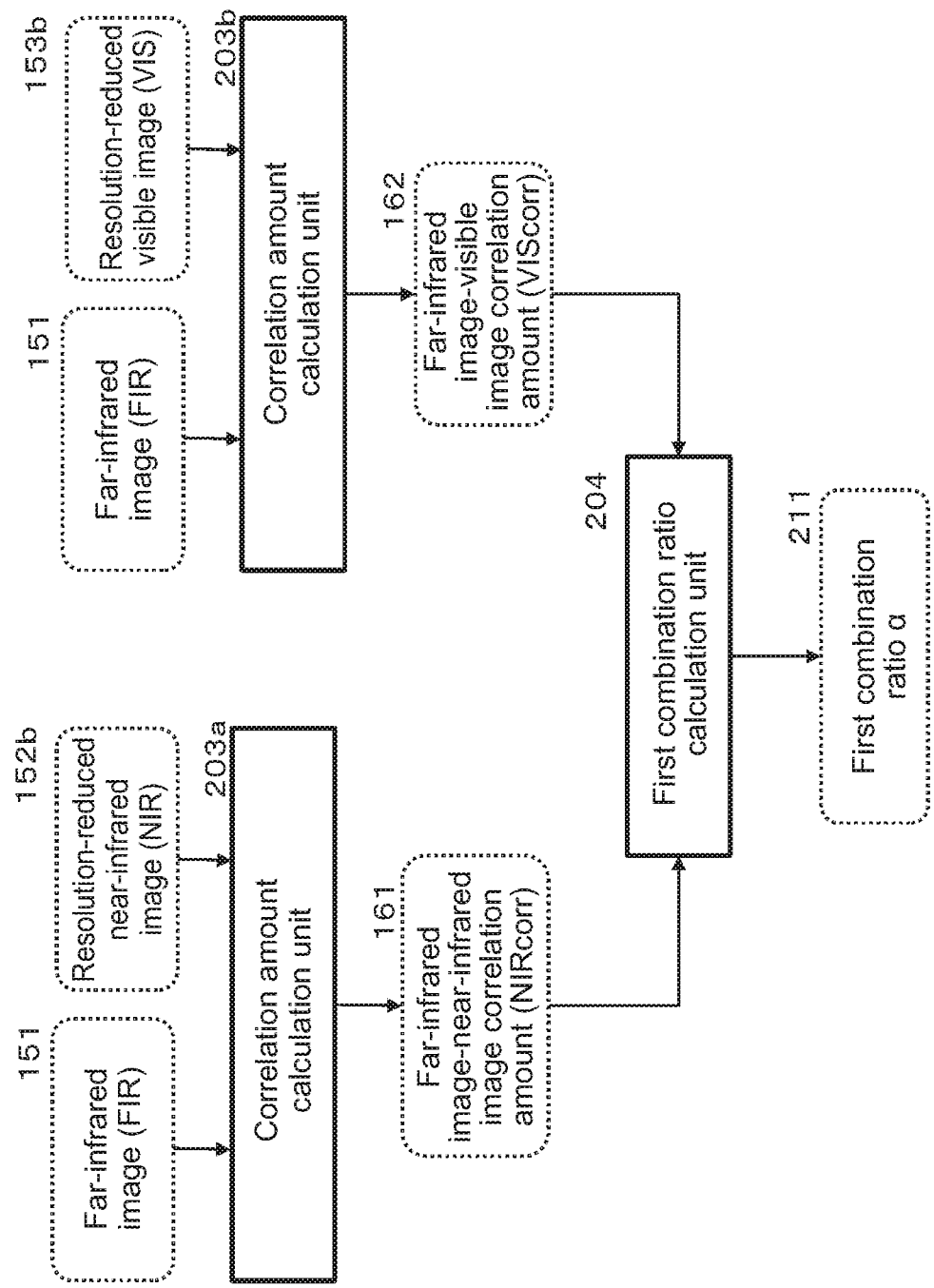
FIG. 9 is a diagram illustrating a process performed by a first combination ratio calculation unit.

FIG. 9 illustrates data input to the first combination ratio calculation unit 204 and data output from the first combination ratio calculation unit 204.

As illustrated in FIG. 9, the first combination ratio calculation unit 204 receives the following data:

(a) The far-infrared image-near-infrared image correlation amount (NIRcorr) 161 from the correlation amount calculation unit 203a; and (b) The far-infrared image-visible image correlation amount (VIScorr) 162 from the correlation amount calculation unit 203b.

As illustrated in FIG. 9, the first combination ratio calculation unit 204 receives the two amounts of correlation, generates the first combination ratio α 211, and outputs the first combination ratio α 211 to the first combination unit 205.

Figure 10:
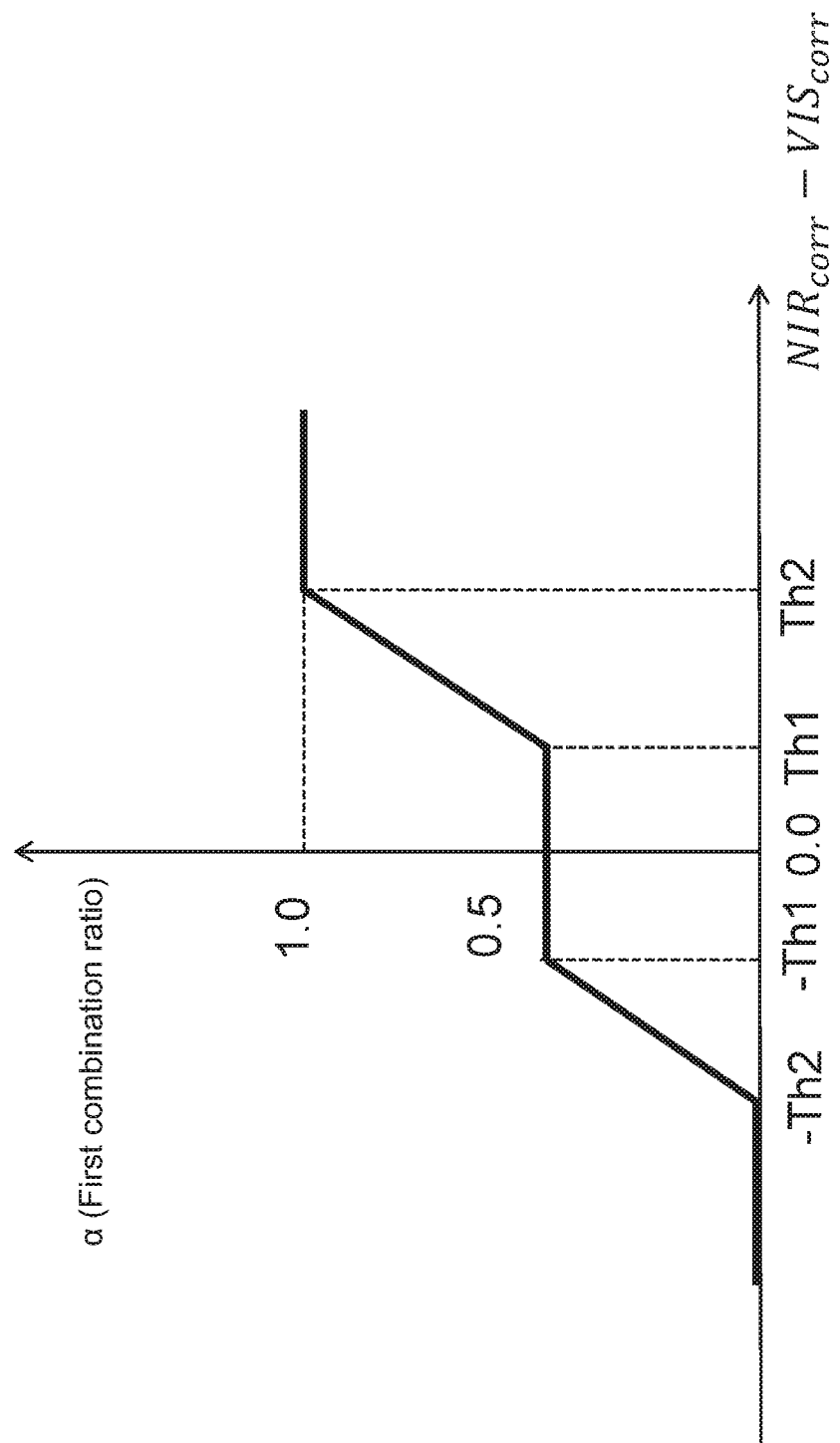
FIG. 10 is a diagram illustrating the process performed by the first combination ratio calculation.

The first combination ratio calculation unit 204 calculates the first combination ratio α 211 from the following input values in accordance with, for example, a graph illustrated in FIG. 10:

(a) The far-infrared image-near-infrared image correlation amount (NIRcorr) 161; and (b) The far-infrared image-visible image correlation amount (VIScorr) 162.

In the graph illustrated in FIG. 10, (NIRcorr−VIScorr) is set to the horizontal axis and the first combination ratio α is set to the vertical axis.

In the graph, (NIRcorr−VIScorr) on the horizontal axis corresponds to the difference between the following two amounts of correlation:

(a) The far-infrared image-near-infrared image correlation amount (NIRcorr) 161 input from the correlation amount calculation unit 203a; and (b) The far-infrared image-visible image correlation amount (VIScorr) 162 input from the correlation amount calculation unit 203b.

In a case in which the far-infrared image-near-infrared image correlation amount (NIRcorr) 161 is greater than the far-infrared image-visible image correlation amount (VIScorr) 162, the difference therebetween is on the right side of the horizontal axis and is equal to or greater than 0.

In a case in which the far-infrared image-near-infrared image correlation amount (NIRcorr) 161 is less than the far-infrared image-visible image correlation amount (VIScorr) 162, the difference therebetween is on the left side of the horizontal axis and is equal to or less than 0.

In a case in which the difference is on the right side of the horizontal axis and is equal to or greater than 0, the amount of correlation of the near-infrared image with the far-infrared image is larger than the amount of correlation of the visible image with the far-infrared image. That is, this means that the near-infrared image has characteristics closer to the far-infrared image than the visible image.

In contrast, in a case in which the difference therebetween is on the left side of the horizontal axis and is equal to or less than 0, the amount of correlation of the visible image with the far-infrared image is larger than the amount of correlation of the near-infrared image with the far-infrared image. That is, this means that the visible image has characteristics closer to the far-infrared image than the near-infrared image.

As understood from the graph illustrated in FIG. 10, the first combination ratio α is set to 0 at a threshold value of −Th2 or less, is set in the range of 0 to 0.5 at a threshold value of −Th2 to −Th1, is set to 0.5 at a threshold value of −Th1 to Th1, is set in the range of 0.5 to 1 at a threshold value of Th1 to Th2, and is set to 1 at a threshold value of Th2 or more.

Specifically, the first combination ratio α=1 at a threshold value of Th2 or more means that the first combination unit 205 performs the process of combining the visible image and the near-infrared image using only the near-infrared image, without using the visible image.

That is, the first combination unit 205 performs the combination process using only the near-infrared image having a high correlation with the far-infrared image which is the image to be corrected.

The first combination ratio α=0.5 at Th1 to −Th1 means that the first combination unit 205 performs the process of combining the visible image and the near-infrared image at a ratio of one to tone in the combination of the visible image and the near-infrared image.

That is, the first combination unit 205 performs the combination process using the visible image and the near-infrared image, which have almost the same correlation with the far-infrared image which is the image to be corrected, at the same ratio.

In addition, the first combination ratio α=0 at a threshold value of −Th2 or less means that the first combination unit 205 performs the process of combining the visible image and the near-infrared image using only the visible, without using the near-infrared image.

That is, the first combination unit 205 performs the combination process using only the visible image having a high correlation with the far-infrared image which is the image to be corrected.

Note that data corresponding to the graph illustrated in FIG. 10 is stored in the first combination ratio calculation unit 204 in advance and the first combination ratio calculation unit 204 calculates the first combination ratio α 211 from the following input values on the basis of the corresponding data:

(a) The far-infrared image-near-infrared image correlation amount (NIRcorr) 161; and (b) The far-infrared image-visible image correlation amount (VIScorr) 162.

Note that the first combination ratio α 211 is calculated for each region, for example, each 7×7 pixel region which is the calculation unit of the amount of correlation in the correlation amount calculation units 203a and b as described above.

Note that the graph illustrated in FIG. 10 is an example and other types of setting data may be used. However, basically, it is assumed that the first combination unit 205 calculates the combination ratio at which the combination process is performed preferentially using the reference image having a large amount of correlation with the far-infrared image which is the image to be corrected.

As such, the first combination ratio calculation unit 204 receives two amounts of correlation from the correlation amount calculation units 203a and 203b, generates the first combination ratio α 211, and outputs the first combination ratio α 211 to the first combination unit 205.

As illustrated in FIG. 5, the first combination unit 205 performs the process of combining the near-infrared image 152 and the visible image 153 which are the reference images and outputs the first composite signal (guide signal) 212 which is a composite image of the near-infrared image 152 and the visible image 153 to the second combination unit 206.

The process performed by the first combination unit 205 will be described in detail with reference to FIG. 11.

Figure 11:
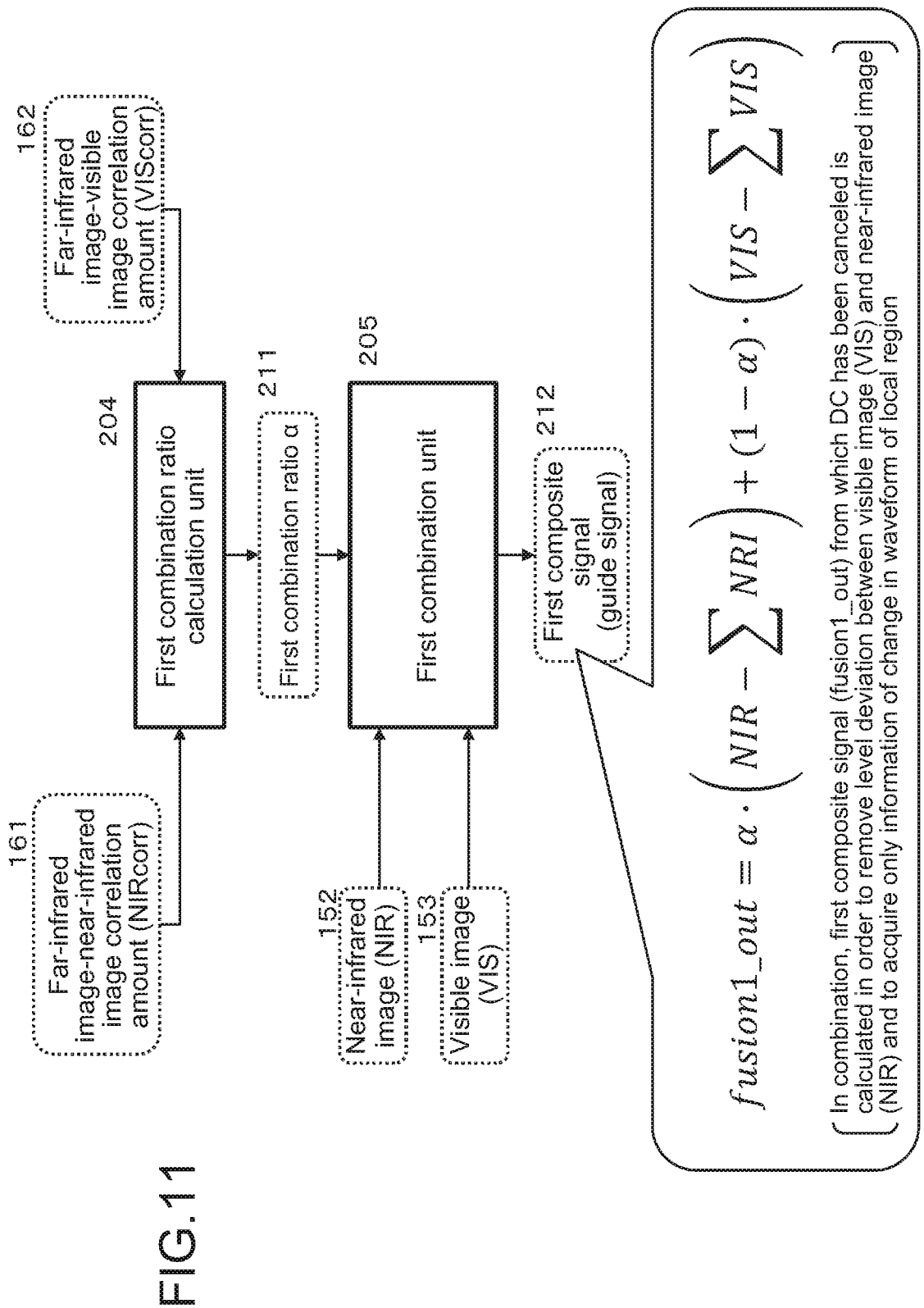
FIG. 11 is a diagram illustrating a process performed by a first combination unit.

As illustrated in FIG. 11, the first combination unit 205 receives the first combination ratio α 211 from the first combination ratio calculation unit 204.

In addition, the first combination unit 205 receives the near-infrared image 152 and the visible image 153.

The first combination unit 205 performs the process of combining the near-infrared image 152 and the visible image 153 in accordance with the first combination ratio α 211 to generate the first composite signal (guide signal) 212 which is a composite image.

The generated first composite signal (guide signal) 212 is output to the second combination unit 206.

For example, as illustrated in FIG. 11, the first composite signal (guide signal) 212 generated by the first combination unit 205 is a signal (fusion1_out) represented by the following (Expression 3).

[Math. 3]

$$\text{fusion1\_out} = \alpha \cdot (\text{NIR} - \Sigma NRI) + (1-\alpha) \cdot (\text{VIS} - \Sigma \text{VIS}) \quad \text{(Expression 3)}$$

Note that, similarly to the first combination ratio α 211, the first composite signal (guide signal (fusion1_out)) 212 calculated by the above-mentioned (Expression 3) is calculated for each region, for example, each 7×7 pixel region which is the calculation unit of the amount of correlation in the correlation amount calculation units 203a and b as described above.

In the above-mentioned (Expression 3), a DC cancellation process, that is, a process of excluding a direct current component is performed in order to reduce the level deviation between the near-infrared image 152 and the visible image 153 and to extract only the information of a change in the waveform of the local region. Specifically, the DC component is canceled by a subtraction process (NIR-ΣNIR) and (VIS-ΣVIS) in parentheses in Equation 3.

As such, the first combination unit 205 performs the process of combining the near-infrared image 152 and the visible image 153 in accordance with the first combination ratio α 211 to generate the first composite signal (guide signal (fusion1_out)) 212 which is a composite image.

The generated first composite signal (guide signal) 212 is output to the second combination unit 206.

As illustrated in FIG. 5, the second combination unit 206 receives the far-infrared image 151 and the first composite signal (guide signal) 212, generates the high-quality far-infrared image 180, and outputs the high-quality far-infrared image 180.

The process performed by the second combination unit 206 will be described in detail with reference to FIG. 12.

Figure 12:
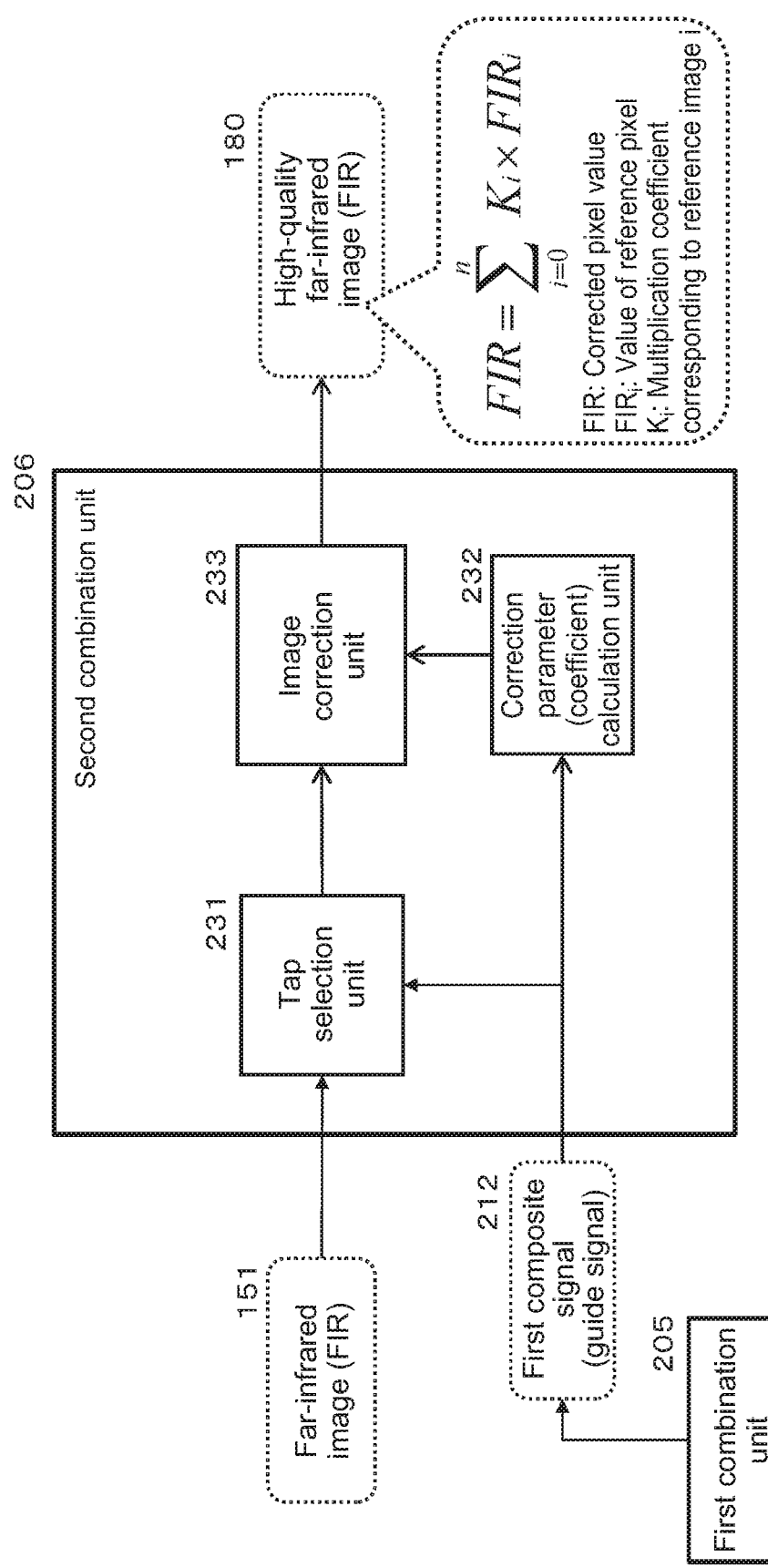
FIG. 12 is a diagram illustrating an example of the configuration of a second combination unit ad a process performed by the second combination unit.

As illustrated in FIG. 12, the second combination unit 206 includes a tap selection unit 231, a correction parameter (coefficient) calculation unit 232, and an image correction unit 233.

The tap selection unit 231 receives a low-resolution far-infrared image 231 and selects a tap for performing image correction for improving a resolution level. Specifically, the tap selection unit 231 sets a reference pixel range applied to a process of correcting the value of a pixel to be corrected.

In addition, the correction parameter calculation unit 232 calculates a correction parameter applied to the process of correcting the values of pixels forming the far-infrared image 231 to be corrected. Specifically, the correction parameter calculation unit 232 calculates a multiplication coefficient $K_i$ to be multiplied by the value of a reference pixel i.

The correction parameter calculation unit 232 receives the first composite signal (guide signal (fusion1_out)) 212 which is a composite image generated by combining the reference images, that is, the near-infrared image 152 and the visible image 153 in the first combination unit 205, selects a correction parameter (coefficient) on the basis of the input signal, and inputs the correction parameter (coefficient) to the image correction unit 233.

As described above, the first composite signal (guide signal (fusion1_out)) 212 is a signal generated for each local region, for example, a 7×7 pixel local region in the image. The correction parameter calculation unit 232 selects a correction parameter (coefficient) for each local region, for example, a 7×7 pixel local region in the image and outputs the correction parameter (coefficient) to the image correction unit 233.

Optimum taps and correction parameters corresponding to various different first composite signals (guide signals (fusion1_out)) are stored in the tap selection unit 231 and the correction parameter calculation unit 232 in advance so as to be associated with the first composite signals.

The tap selection unit 231 and the correction parameter calculation unit 232 select and acquire taps and correction parameters associated with the first composite signal (guide signal (fusion1_out)) 212 input from the first combination unit 205 from the stored data and output the taps and the correction parameters to the image correction unit 233, respectively.

The data of the optimum taps and the optimum correction parameters which are associated with the first composite signal (guide signal (fusion1_out)) and are used by the tap selection unit 231 and the correction parameter calculation unit 232 is generated by a learning process that is performed in advance.

The learning process will be described with reference to FIG. 13.

Figure 13:
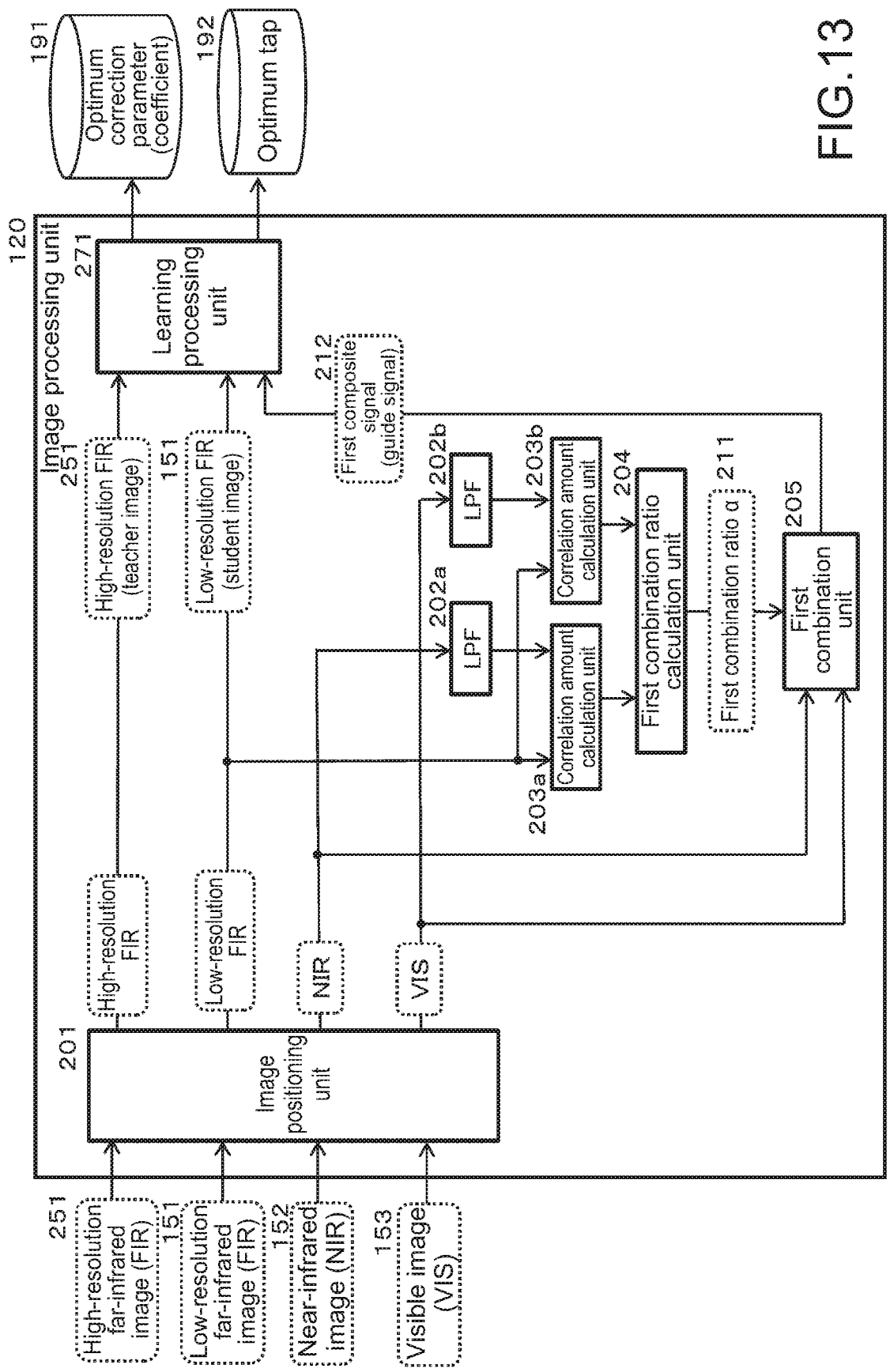
FIG. 13 is a diagram illustrating a learning process for acquiring, for example, a correction parameter applied in the second combination unit.

FIG. 13 is a diagram illustrating the configuration of an image processing unit 120 that performs a process for calculating the taps and the correction coefficients applied to the process of improving the quality of the far-infrared image.

The image processing unit 120 has almost the same configuration as the image processing unit 120 described with reference to FIG. 5.

The image processing unit 120 differs from the image processing unit 120 illustrated in FIG. 5 in that a learning processing unit 271 replaces the second combination unit 206 in FIG. 13 and a high-resolution far-infrared image 251 is added as an input image in FIG. 13.

A low-resolution far-infrared image 151 illustrated as an input image in FIG. 13 is the same low-resolution image as the far-infrared image 151 which is the image to be corrected illustrated in FIG. 5.

The learning processing unit 271 of the image processing unit 120 illustrated in FIG. 13 receives the high-resolution far-infrared image 251, the low-resolution far-infrared image 151, and the first composite signal (guide signal (fusion1_out)) 212 output from the first combination unit 205 and performs a learning process.

As a result of the learning process, an optimum correction parameter 191 which is correspondence data to the optimum correction parameter (coefficient) corresponding to various first composite signals (guide signals (fusion1_out)) and an optimum tap 192 which is correspondence data to the optimum tap corresponding to various first composite signals (guide signals (fusion1_out)) are generated.

Specifically, the learning processing unit 27 performs a "supervised learning process" using the high-resolution far-infrared image 251 as a teacher image and the low-resolution far-infrared image 151 as a student image to calculate an optimum correction parameter (coefficient) or an optimum tap corresponding to various signal values of the first composite signal (guide signal (fusion1_out)) output from the first combination unit 205.

Note that the optimum tap and the optimum correction parameter is an optimum tap and an optimum correction parameter for bringing the pixel value of the low-resolution far-infrared image 151, which is a student image, into closer to the pixel value of the high-resolution far-infrared image 251 which is a teacher image.

The learning processing unit 271 receives the low-resolution far-infrared images 151 which are various types of different student images and the high-resolution far-infrared image 251 which is a teacher image and performs the learning process to calculate optimum taps and optimum correction parameters corresponding to image regions having various different characteristics.

The optimum correction parameters corresponding to the image regions having various different characteristics correspond to optimum taps and correction parameters corresponding to various different first composite signals (guide signals (fusion1_out)).

The image processing unit 120 illustrated in FIG. 13 performs the learning process to calculate optimum taps and correction parameters corresponding to various different first composite signals (guide signals (fusion1_out)).

The tap selection unit 231 of the second combination unit 206 illustrated in FIG. 12 selects a tap most suitable for the far-infrared image quality improvement process from the result of the learning process and outputs the selected tap to the image correction unit 233.

The correction parameter (coefficient) calculation unit 232 of the second combination unit 206 illustrated in FIG. 12 selects a correction parameter most suitable for the far-infrared image quality improvement process from the correction parameters calculated in advance by the learning process and outputs the selected correction parameter to the image correction unit 233.

That is, taps and correction parameters which are most suitable for each region and correspond to various first composite signals (guide signals (fusion1_out)) for each image region generated by the first combination unit 205 are output to the image correction unit 233.

The image correction unit 233 corrects the values of the pixels forming the far-infrared image 151, using the tap (reference pixel region) set by the tap selection unit 231 and the correction parameter input from the correction parameter (coefficient) calculation unit 232. Note that the pixel values are corrected using the correction parameter selected for each region corresponding to the first composite signal (guide signal (fusion1_out)).

That is, the correction process is performed using the optimum correction parameter corresponding to the characteristics of the image.

The correction of the pixel value by the image correction unit 233 is performed in accordance with, for example, the following (Expression 4).

[Math. 4]

$$FIR = \sum_{i=0}^{n} K_i \times FIR_i \quad \text{(Expression 4)}$$

Note that, in the above-mentioned (Expression 4), each symbol has the following meaning:

FIR: a corrected value of the pixel to be corrected;
$FIR_i$: a value of the reference pixel;
i: an identifier of the reference pixel; and
$K_i$: a multiplication coefficient (correction parameter) corresponding to the reference pixel i.

The correction parameter input from the correction parameter (coefficient) calculation unit 232 is used as $K_i$.

The second combination unit 206 sequentially corrects the values of the pixels forming the far-infrared image 151 which is the image to be corrected in accordance with the above-mentioned (Expression 4) to generate the high-quality far-infrared image 180 and outputs the high-quality far-infrared image 180.

The pixel values of the far-infrared image 151 which is the image to be corrected and the first composite signal (guide signal) 212 which is a composite image of the near-infrared image and the visible image as the reference images are combined in units of regions by the combination process of the second combination unit 206.

The first composite signal (guide signal) 212 is a composite image generated by increasing the combination ratio of the reference images having a large amount of correlation with the far-infrared image 151 which is the image to be corrected. In addition, the tap and the correction parameter applied to the correction process are values which have been generated by the learning process and are most suitable for improving the quality of the far-infrared image.

As such, the second combination unit 206 performs pixel value correction for each region of the far-infrared image 151 which is the image to be corrected on the basis of the optimum first composite signal (guide signal), the optimum tap, and the optimum correction parameter to generate the high-quality far-infrared image 180 and outputs the high-quality far-infrared image 180.

3. For Process Sequence Performed by Image Processing Apparatus

Next, the sequence of the process performed by the image processing unit illustrated in FIG. 5, that is, the sequence of the far-infrared image quality improvement process will be described with reference to a flowchart illustrated in FIG. 14.

Figure 14:
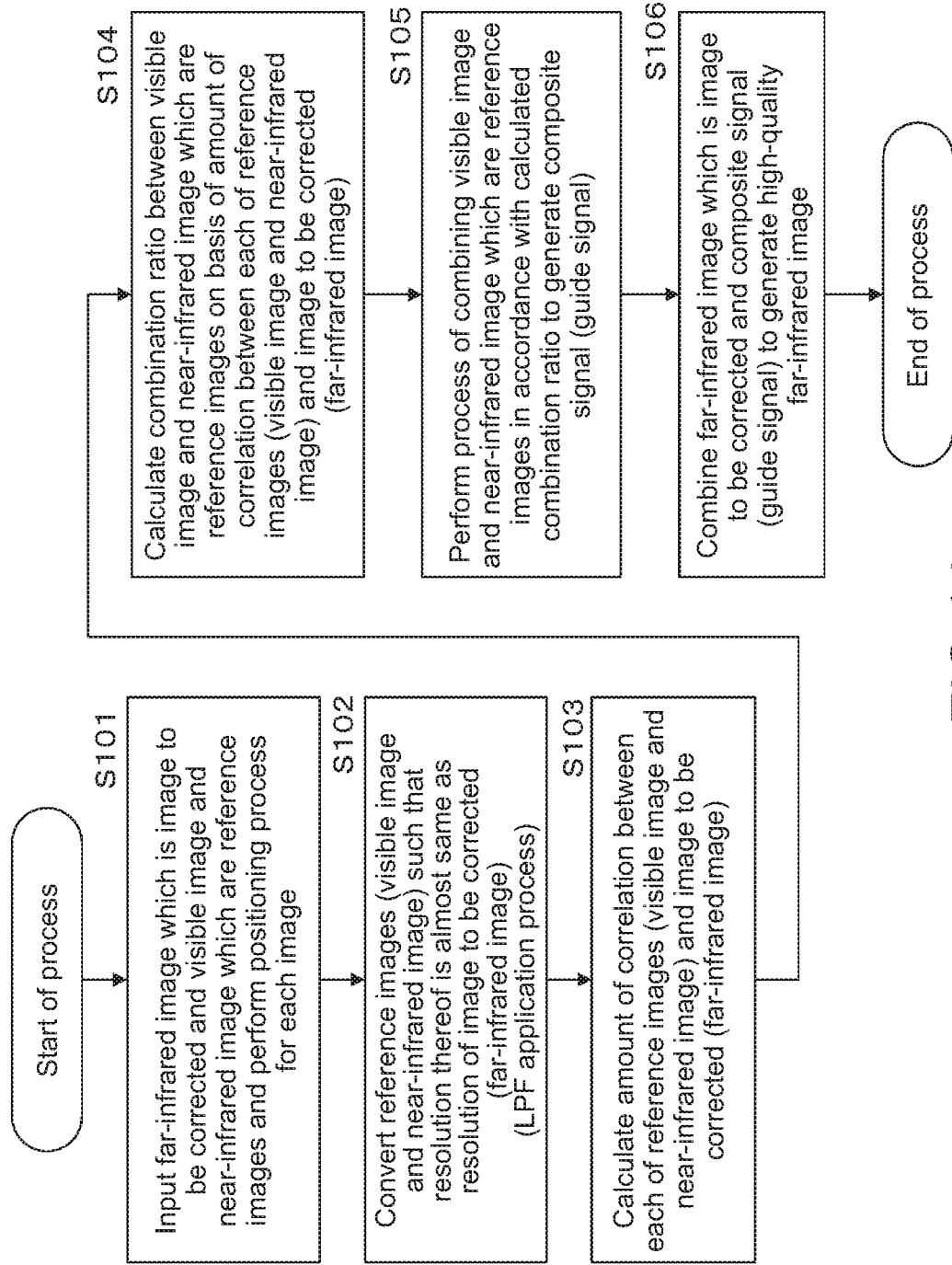
FIG. 14 is a flowchart illustrating an image processing sequence performed by the image processing apparatus.

For example, the process according to the flow illustrated in FIG. 14 is performed in accordance with the program stored in the storage unit of the image processing apparatus under the control of the control unit with a program execution function.

Hereinafter, processes in each step of the flow illustrated in FIG. 14 will be sequentially described.

(Step S101)

First, in Step S101, the image processing apparatus receives the far-infrared image which is the image to be corrected and the visible image and the near-infrared image which are the reference images and performs a process of positioning each image.

This process is the process performed by the image positioning unit 201 of the image processing unit 120 illustrated in FIG. 5.

The image positioning unit 201 performs the image positioning process for three types of input images such that the same object is located at the same position.

Note that the image positioning is performed by the existing process, for example, a process using the amount of disparity of each image or a motion vector.

(Step S102)

Then, in Step S102, the image processing apparatus converts the visible image and the near-infrared image which are the reference images such that the resolution thereof is substantially equal to the resolution of the far-infrared image which is the image to be corrected. That is, the image processing apparatus performs a process of applying an LPF to reduce the resolution.

This process is the process performed by the low-pass filters (LPFs) 202a and 202b of the image processing unit 120 illustrated in FIG. 5.

The low-pass filters (LPFs) 202a and 202b perform the resolution adjustment process of reducing the resolution level of the near-infrared image and the visible image which are the reference images to the resolution level of the far-infrared image which is the image to be corrected.

(Step S103)

Then, in Step S103, the image processing apparatus calculates the amount of correlation between each of the visible image and the near-infrared image which are the reference images and the far-infrared image which is the image to be corrected.

This process is the process performed by the correlation amount calculation units 203a and 203b of the image processing unit 120 illustrated in FIG. 5.

The correlation amount calculation unit 203a of the image processing unit 120 illustrated in FIG. 5 calculates the amount of correlation between the far-infrared image 151 which is the image to be corrected and the resolution-reduced near-infrared image 152b which is the reference image and whose resolution has been reduced to almost the same resolution as that of the far-infrared image 151, as described with reference to FIG. 7.

For example, the correlation amount calculation unit 203a calculates zero mean normalized cross correlation (ZNCC) as the amount of correlation for each predetermined local region (for example, 7×7 pixels).

In addition, the correlation amount calculation unit 203b of the image processing unit 120 illustrated in FIG. 5 calculates the amount of correlation between the far-infrared image 151 which is the image to be corrected and the resolution-reduced visible image 153b which is the reference image and whose resolution has been reduced to almost the same resolution as that of the far-infrared image 151, as described with reference to FIG. 8.

For example, the correlation amount calculation unit 203b calculates zero mean normalized cross correlation (ZNCC) as the amount of correlation for each predetermined local region (for example, 7×7 pixels).

(Step S104)

Then, in Step S104, the image processing apparatus calculates the combination ratio of the visible image and the near-infrared image which are the reference images in accordance with the amount of correlation between the far-infrared image which is the image to be corrected and each of the visible image and the near-infrared image which are the reference images.

This process is the process performed by the first combination ratio calculation unit 204 of the image processing unit 120 illustrated in FIG. 5.

As illustrated in FIG. 5, the first combination ratio calculation unit 204 receives two amounts of correlation from the correlation amount calculation units 203a and 203b, generates the first combination ratio α 211, and outputs the first combination ratio α 211 to the first combination unit 205.

First, as described with reference to FIGS. 9 and 10, for example, the first combination ratio calculation unit 204 calculates the first combination ratio α 211 from the following input values in accordance with the graph illustrated in FIG. 10:

(a) The far-infrared image-near-infrared image correlation amount (NIRcorr) 161; and (b) The far-infrared image-visible image correlation amount (VIScorr) 162.

The first combination ratio calculation unit 204 calculates a combination ratio such that the combination process is performed preferentially using the reference image having a large amount of correlation with the far-infrared image which is the image to be corrected.

(Step S105)

Then, in Step S105, the image processing apparatus performs the process of combining the visible image and the near-infrared image which are the reference images in accordance with the combination ratio calculated in Step S104 to generate a composite signal (guide signal).

This process is the process performed by the first combination unit 205 of the image processing unit 120 illustrated in FIG. 5.

As illustrated in FIG. 5, the first combination unit 205 performs the process of combining the near-infrared image 152 and the visible image 153 which are the reference images and outputs the first composite signal (guide signal) 212 which is a composite image of the near-infrared image 152 and the visible image 153 to the second combination unit 206.

First, as described with reference to FIG. 11, the first combination unit 205 performs the process of combining the near-infrared image 152 and the visible image 153 in accordance with the first combination ratio α 211 to generate the first composite signal (guide signal) 212 which is a composite image.

(Step S106)

Then, in Step S106, the image processing apparatus combines the far-infrared image which is the image to be corrected and the composite signal (guide signal) to generate a high-quality far-infrared image.

This process is the process performed by the second combination unit 206 of the image processing unit 120 illustrated in FIG. 5.

As illustrated in FIG. 5, the second combination unit 206 receives the far-infrared image 151 and the first composite signal (guide signal) 212, generates the high-quality far-infrared image 180, and outputs the high-quality far-infrared image 180.

First, as described with reference to FIGS. 12 and 13, the second combination unit 206 includes the tap selection unit 231, the correction parameter (coefficient) calculation unit 232, and the image correction unit 233.

The tap selection unit 231 receives the low-resolution far-infrared image 231 and selects a tap for performing image correction for improving a resolution level. The correction parameter calculation unit 232 calculates a correction parameter to be applied to the process of correcting the values of the pixels forming the far-infrared image 231 to be corrected.

The data of the optimum tap and the optimum correction parameter which are associated with the first composite signal (guide signal (fusion1_out)) and are used by the tap selection unit 231 and the correction parameter calculation unit 232 is generated by the learning process that is performed in advance.

The learning process has been described with reference to FIG. 13.

The image correction unit 233 corrects the values of the pixels forming the far-infrared image 151, using the tap (reference pixel region) set by the tap selection unit 231 and the correction parameter input from the correction parameter (coefficient) calculation unit 232. Note that the pixel values are corrected using the correction parameter selected for each region corresponding to the first composite signal (guide signal (fusion1_out)).

That is, the correction process is performed using the optimum correction parameter corresponding to the characteristics of the image.

The second combination unit 206 sequentially corrects the values of the pixels forming the far-infrared image 151 which is the image to be corrected in accordance with the above-mentioned (Expression 4) to generate the high-quality far-infrared image 180 and outputs the high-quality far-infrared image 180.

That is, the high-quality far-infrared image 180 is generated by the process of combining the pixel values of the far-infrared image 151 which is the image to be corrected and the first composite signal (guide signal) 212 which is a composite image of the near-infrared image and the visible image as the reference images in units of regions.

As described above, the first composite signal (guide signal) 212 is an image generated by increasing the combination ratio of the reference images having a large amount of correlation with the far-infrared image 151 which is the image to be corrected. In addition, the tap and the correction parameter applied to the correction process are values which have been generated by the learning process and are most suitable for improving the quality of the far-infrared image.

As such, the second combination unit 206 performs pixel value correction for each region of the far-infrared image 151 which is the image to be corrected on the basis of the optimum first composite signal (guide signal), the optimum tap, and the optimum correction parameter to generate the high-quality far-infrared image 180 and outputs the high-quality far-infrared image 180.

4. For Characteristics of Far-Infrared Image, Visible Image, and Near-Infrared Image and Availability of Quality-Improved Image of Far-Infrared Image Next, the characteristics of a far-infrared image, a visible image, and a near-infrared image and the availability of a quality-improved image of the far-infrared image will be described.

In the above-described embodiment, the configuration and process of the image processing apparatus that generates a high-resolution and high-quality far-infrared image, using the far-infrared image which is a low-quality image, such as a low-resolution image, as the image to be corrected and the visible image or the near-infrared image which is a high-quality image as the reference image have been described.

The characteristics of each of the images used in the above-described embodiment, that is, the far-infrared image, the visible image, and the near-infrared image will be described with reference to FIG. 15.

FIG. 15 is a diagram illustrating the characteristics of the visible image, the near-infrared image, and the far-infrared image.

The characteristics of the visible image, the near-infrared image, and the far-infrared image are shown for each of the following items:

(1) Whether temperature information can be acquired;
(2) Whether object information can be acquired in a dark environment;
(3) Whether object information can be acquired in a bright environment;
(4) Whether object information can be acquired in a distant view;
(5) Whether object information can be acquired in a near view;
(6) Whether pattern information of, for example, a printed matter can be acquired; and
(7) Whether a high-resolution image can be acquired.

The visible image has the characteristics that it is impossible or difficult to process two items (1) and (2) and the other items (3) to (7) are OK (○), that is, available.

The near-infrared image has the characteristics that it is impossible or difficult to process three items (1), (4), and (6) and the other items (2), (3), (5), and (7) are OK (○), that is, available.

In addition, the far-infrared image has the characteristics that it is impossible or difficult to process two items (6) and (7) and the other items (1) to (5) are OK (○), that is, available.

As described above, for the far-infrared image, it is difficult to acquire a high-resolution image or the pattern of a printed matter, but it is possible to detect, for example, the image of an object with temperature, for example, a person. In addition, it is possible to detect a person or a high-temperature car, regardless of whether there is ambient light, a near view, or a distant view. For example, an in-vehicle camera is used to present the driver with the information of a person or a vehicle ahead.

In addition, the resolution improvement process according to the above-described embodiment is performed to display clearer image information of a person or a vehicle.

5. (Embodiment 2) For Embodiment Using Short-Wave Infrared Image

Next, an embodiment using a short-wave infrared image will be described as Embodiment 2.

In Embodiment 1 described with reference to FIG. 5 and other figures, an example of the process which applies the visible image and the near-infrared image as the reference images to the far-infrared image which is the image to be corrected has been described.

Next, as Embodiment 2, an example of a process which applies a visible image and a short-wave infrared image as the reference images to a far-infrared image which is the image to be corrected will be described.

As described above with reference to FIG. 1, the short-wave infrared (SWIR: Short Wave IneraRed) image is obtained by capturing a short-wave infrared rays (SWIR) with a wavelength of about 1 μm to 2.5 μm.

The short-wave infrared rays have the characteristics that they have a wavelength longer than near-infrared rays (NIR) and are capable of acquiring a clearer image in a distant view than a near-infrared image.

In Embodiment 2, similarly to Embodiment 1, for example, the imaging apparatus having the configuration illustrated in FIG. 4 can be used as an image processing apparatus. Note that, in Embodiment 2, the process can be performed not only by the imaging apparatus but also by an information processing apparatus, such as a PC, that receives an image captured by the imaging apparatus and performs image processing.

The image processing apparatus according to Embodiment 2 has a configuration in which a short-wave infrared imaging unit replaces the near-infrared imaging unit 112 of the imaging unit 106 illustrated in FIG. 4 and differs from the image processing apparatus according to Embodiment 1 in the configuration and process of the image processing unit 120.

The configuration and process of an image processing unit 120 according to Embodiment 2 will be described with reference to FIG. 16.

In this embodiment, the image processing unit 120 receives three types of images, that is, a far-infrared image (FIR) 151 captured by a far-infrared imaging unit 111, a short-wave infrared image (SWIR) 154 captured by a short-wave infrared imaging unit, and a visible image (VIS) 153 captured by a visible imaging unit 113, performs a quality improvement process with the three types of images to generate a high-quality far-infrared image (FIR) 180, and outputs the high-quality far-infrared image (FIR) 180.

As described above, the image to be corrected which is to be subjected to the quality improvement process is a far-infrared image.

A visible image and a short-wave infrared image are used as the reference images for the image correction process.

A process performed by the image processing unit 120 will be described.

First, the image processing unit 120 inputs three types of images, that is, the far-infrared image (FIR) 151 captured by the far-infrared imaging unit 111, the short-wave infrared image (SWIR) 154 captured by the short-wave infrared imaging unit, and the visible image (VIS) 153 captured by the visible imaging unit 113 to an image positioning unit 301.

The image positioning unit 301 performs an image positioning process for the three types of images such that the same object is located at the same position.

Note that the image positioning is performed by the existing process, for example, a process using the amount of disparity of each image or a motion vector.

Note that, in a case in which the three types of images have different sizes, desirably, a scaling process which adjusts the sizes of the images to be equal to each other is performed in advance and then the image positioning process is performed.

Among the images positioned by the image positioning unit 301, the short-wave infrared image 154 and the visible image 153 which are the reference images are input to low-pass filters (LPFs) 302a and 302b.

The low-pass filters (LPFs) 302a and 302b perform a resolution adjustment process that reduces the resolution level of the short-wave infrared image 154 and the visible image 153 which are the reference images to the resolution level of the far-infrared image 151 which is the image to be corrected.

The resolution adjustment process is a process for accurately performing the calculation of the amount of correlation in correlation amount calculation units 303a and 303b.

Figure 16:
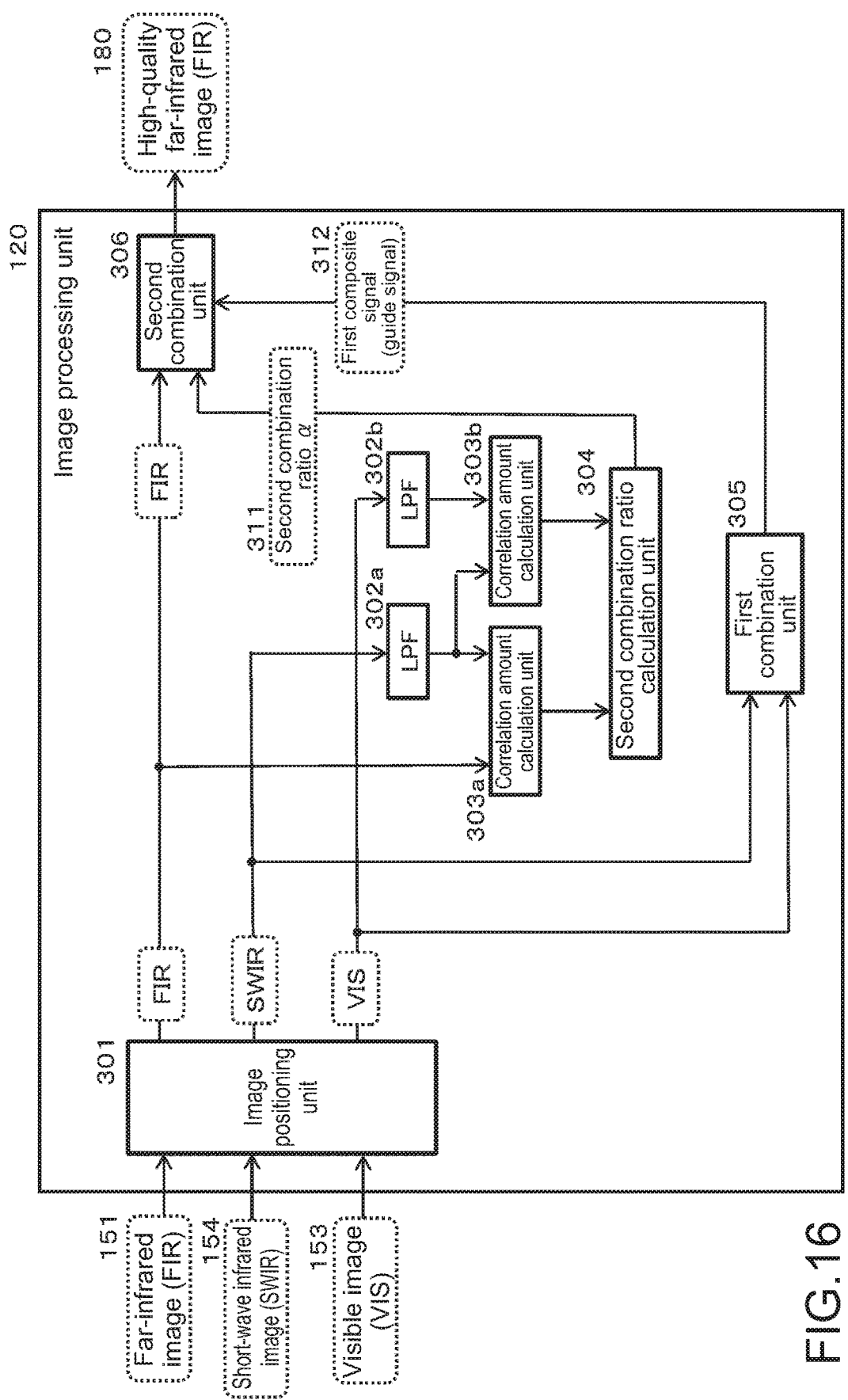
FIG. 16 is a diagram illustrating the configuration and process of an image processing unit.

As illustrated in FIG. 16, the processing results of the low-pass filters (LPFs) 302a and 302b are input to the correlation amount calculation units 303a and 303b.

As illustrated in FIG. 16, the short-wave infrared image 154 subjected to the resolution reduction process and the far-infrared image 151 which is the image to be corrected are input to the correlation amount calculation unit 303a.

In addition, the short-wave infrared image 154 subjected to the resolution reduction process and the visible image 153 subjected to the resolution reduction process are input to the correlation amount calculation unit 303b.

Embodiment 2 differs from Embodiment 1 in that the far-infrared image 151 which is the image to be corrected is not input to the correlation amount calculation unit 303b and the short-wave infrared image 154 and the visible image 153 which are the reference images and have been subjected to the resolution reduction process are input to the correlation amount calculation unit 303b.

The correlation amount calculation unit 303a calculates the amount of correlation between the short-wave infrared image 154 subjected to the resolution reduction process and the far-infrared image 151 which is the image to be corrected.

In addition, the correlation amount calculation unit 303b calculates the amount of correlation between the short-wave infrared image 154 subjected to the resolution reduction process and the visible image 153 subjected to the resolution reduction process.

The correlation amount calculation process is the same process as that described with reference to FIGS. 7 and 8 in Embodiment 1 and calculates the amount of correlation for each local region (for example, 7×7 pixels), using zero mean normalized cross correlation (ZNCC) as in, for example, (Expression 1) and (Expression 2).

As such, the correlation amount calculation unit 303a calculates a far-infrared image-short-wave infrared image correlation amount (corr_fs) and outputs the calculated value to a second combination ratio calculation unit 304.

In addition, the correlation amount calculation unit 303b calculates a visible image-short-wave infrared image correlation amount (corr_vs) and outputs the calculated value to the second combination ratio calculation unit 304.

In Embodiment 2, the amount of correlation between the far-infrared image and the short-wave infrared image having wavelengths close to each other and the amount of correlation between the visible image and the short-wave infrared image having wavelengths close to each other are calculated.

Next, a process performed by the second combination ratio calculation unit 304 will be described.

As illustrated in FIG. 16, the second combination ratio calculation unit 304 receives two amounts of correlation from the correlation amount calculation units 303a and 303b, generates a second combination ratio α 311, and outputs the second combination ratio α 311 to a second combination unit 306.

Note that the second combination ratio α is the combination ratio of a first composite signal (guide signal) 312 generated by a first combination unit 305 in the process of combining the far-infrared image and the first composite signal (guide signal) 312 in the second combination unit 206 and has a value of $0 \leq \alpha \leq 1$.

The second combination unit 306 performs an image combination process using the first composite signal (guide signal) 312 with a combination ratio α and the far-infrared image with a combination ratio (1−α) to generate a high-quality far-infrared image 180. For example, in a case in which the high-quality far-infrared image 180 is (FIR_out), the first composite signal (guide signal) 312 is (fusion1_out), and the input far-infrared image 151 is (FIR_in), the second combination unit 306 generates a high-quality far-infrared image (FIR_out) in accordance with the following expression:

(FIR_out)=α(fusion1_out)+(1−α)(FIR_in).

This process will be described in detail below.

A specific example of the process performed by the second combination ratio calculation unit 304 will be described with reference to FIGS. 17 and 18.

Figure 17:
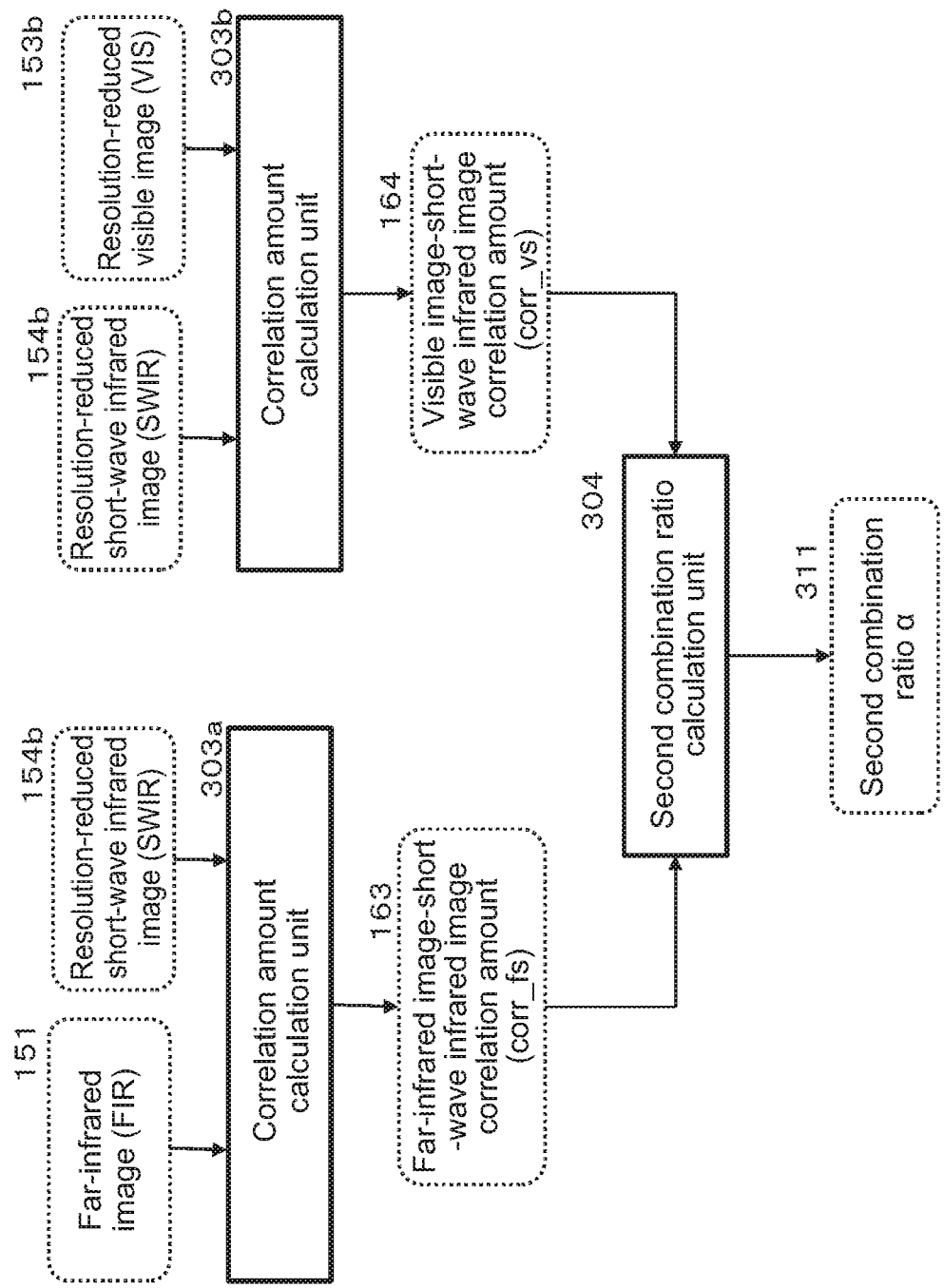
FIG. 17 is a diagram illustrating a process performed by a second combination ratio calculation unit.

FIG. 17 illustrates data input to the second combination ratio calculation unit 304 and data output from the first combination ratio calculation unit 304.

As illustrated in FIG. 17, the second combination ratio calculation unit 304 receives the following data:

(a) A far-infrared image-short-wave infrared image correlation amount (corr_fs) 163 from the correlation amount calculation unit 303a; and (b) A visible image-short-wave infrared image correlation amount (corr_vs) 164 from the correlation amount calculation unit 303b.

As illustrated in FIG. 17, the second combination ratio calculation unit 304 receives the two amounts of correlation, generates the second combination ratio α 311, and outputs the second combination ratio α 311 to the second combination unit 306.

Figure 18:
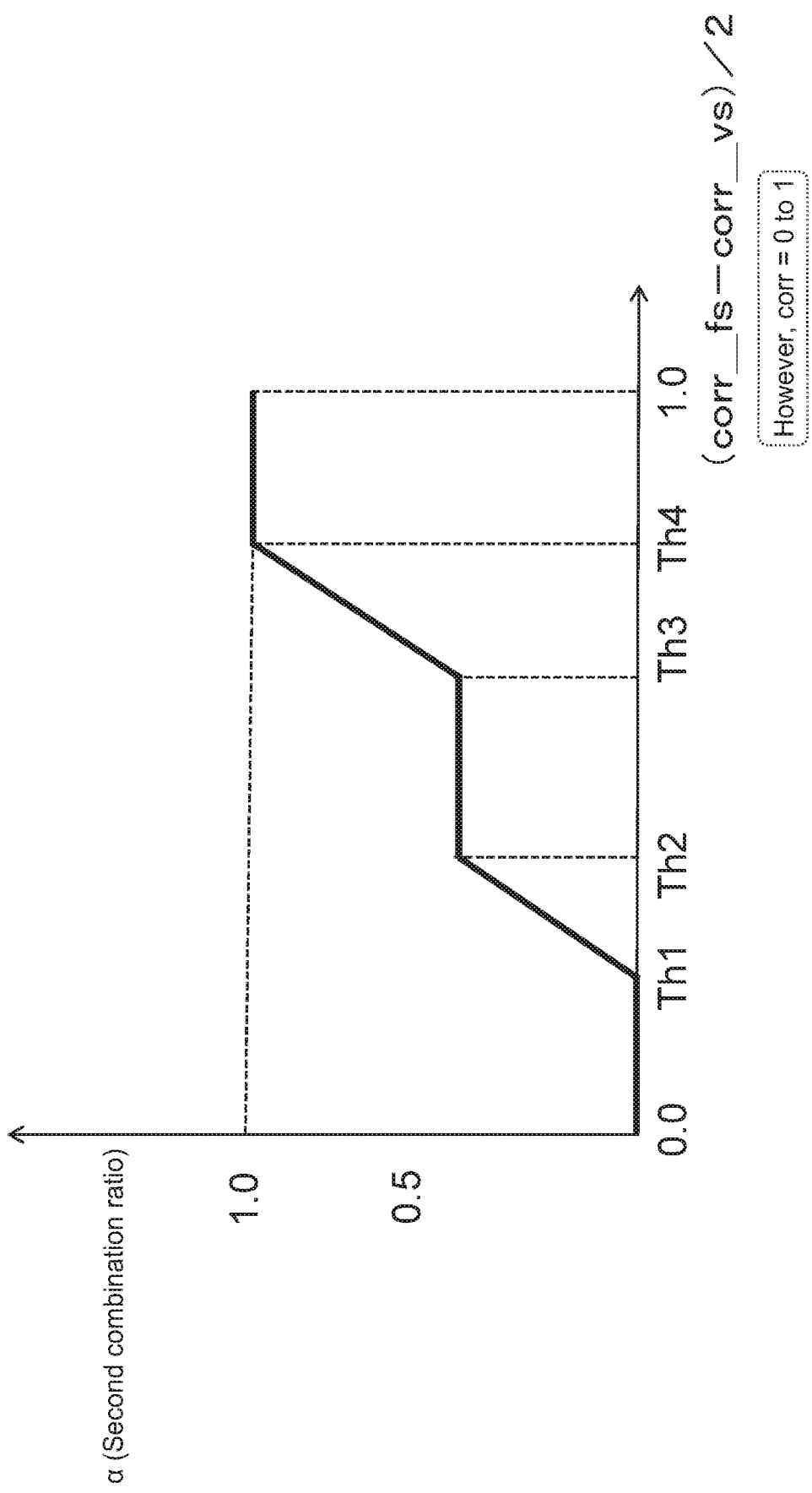
FIG. 18 is a diagram illustrating the process performed by the second combination ratio calculation unit.

The second combination ratio calculation unit 304 calculates the second combination ratio α 311 from the following input values in accordance with, for example, a graph illustrated in FIG. 18:

(a) The far-infrared image-short-wave infrared image correlation amount (corr_fs) 163; and (b) The visible image-short-wave infrared image correlation amount (corr_vs) 164.

In the graph illustrated in FIG. 18, (corr_fs-corr_vs)/2 is set to the horizontal axis and the second combination ratio α is set to the vertical axis.

In the graph, (corr_fs-corr_vs)/2 on the horizontal axis corresponds to half of the difference between the following two amounts of correlation:

(a) The far-infrared image-short-wave infrared image correlation amount (corr_fs) 163 input from the correlation amount calculation unit 303a; and (b) The visible image-short-wave infrared image correlation amount (corr_vs) 164 input from the correlation amount calculation unit 303b.

In a case in which the far-infrared image-short-wave infrared image correlation amount (corr_fs) 163 is greater than the visible image-short-wave infrared image correlation amount (corr_vs) 164, half of the difference therebetween is on the right side of the center of the horizontal axis, for example, on the right side of the midpoint between a threshold value Th2 and a threshold value Th3.

In a case in which the far-infrared image-short-wave infrared image correlation amount (corr_fs) 163 is less than the visible image-short-wave infrared image correlation amount (corr_vs) 164, half of the difference therebetween is on the left side of the horizontal axis, for example, on the left side of the midpoint between the threshold value Th2 and the threshold value Th3.

That is, a case in which the far-infrared image-short-wave infrared image correlation amount (corr_fs) 163 is greater than the visible image-short-wave infrared image correlation amount (corr_vs) 164 means that the similarity between the far-infrared image and the short-wave infrared image is greater than the similarity between the visible image and the short-wave infrared image.

In this case, the second combination ratio α is set to a large value (a value close to 1).

As described above, the second combination ratio α is the combination ratio of the first composite signal (guide signal) 312 generated by the first combination unit 305 in the process of combining the far-infrared image and the first composite signal (guide signal) 312 in the second combination unit 306.

Since the second combination ratio α is set to a large value (a value close to 1), the high-quality far-infrared image 180 generated by the second combination unit 306 is generated as a composite image that is greatly affected by the first composite signal (guide signal) 312.

This is a process based on the determination that the amount of correlation between the far-infrared image and the short-wave infrared image is large and is a process based on the determination that it is possible to increase the combination ratio of the combination ratio of the first composite signal (guide signal) 312 which is the reference image.

In contrast, in a case in which the far-infrared image-short-wave infrared image correlation amount (corr_fs) 163 is less than the visible image-short-wave infrared image correlation amount (corr_vs) 164, half of the difference therebetween is on the left side of the horizontal axis in the graph illustrated in FIG. 18, for example, on the left side of the midpoint between the threshold value Th2 and the threshold value Th3.

This means that the similarity between the far-infrared image and the short-wave infrared image is less than the similarity between the visible image and the short-wave infrared image.

In this case, the second combination ratio α is set to a small value (a value close to 0).

Since the second combination ratio α is set to a small value (a value close to 0), the high-quality far-infrared image 180 generated by the second combination unit 306 is generated as a composite image that is less affected by the first composite signal (guide signal) 312.

This is a process based on the determination that the amount of correlation between the far-infrared image and the short-wave infrared image is small and is a process based on the determination that it is not desirable to increase the combination ratio of the combination ratio of the first composite signal (guide signal) 312 which is the reference image.

Note that, in the graph illustrated in FIG. 18, the second combination ratio α is set to 0 at a threshold value of Th1 or less, is set in the range of 0 to 0.5 at a threshold value of Th1 to Th2, is set to 0.5 at a threshold value of Th2 to Th3, is set in the range of 0.5 to 1.0 at a threshold value of Th3 to Th4, and set to 1.0 at a threshold value of Th4 or more.

In the graph illustrated in FIG. 18, in the process of generating the high-quality far-infrared image using the combination process of the second combination unit 306, the second combination ratio α at which the contribution ratio of the first composite signal (guide signal) 312 is set to a large value in a case in which the far-infrared image-short-wave infrared image correlation amount (corr_fs) 163 is greater than the visible image-short-wave infrared image correlation amount (corr_vs) 164 and the contribution ratio of the first composite signal (guide signal) 312 is set to a small value in a case in which the far-infrared image-short-wave infrared image correlation amount (corr_fs) 163 is less than the visible image-short-wave infrared image correlation amount (corr_vs) 164 is output.

Note that the line graph illustrated in FIG. 18 is an example and, for example, a graph formed by one straight line or curve may be used.

However, desirably, the contribution ratio of the first composite signal (guide signal) 312 is set to a large value in a case in which the far-infrared image-short-wave infrared image correlation amount (corr_fs) 163 is greater than the visible image-short-wave infrared image correlation amount (corr_vs) 164, and the contribution ratio of the first composite signal (guide signal) 312 is set to a small value in a case in which the far-infrared image-short-wave infrared image correlation amount (corr_fs) 163 is less than the visible image-short-wave infrared image correlation amount (corr_vs) 164.

Note that the second combination ratio calculation unit 304 calculates the second combination ratio α 311 for each region, for example, each 7×7 pixel region which is the calculation unit of the amount of correlation in the correlation amount calculation units 303a and b as described above.

As such, the second combination ratio calculation unit 304 receives two amounts of correlation from the correlation amount calculation units 303a and 303b, generates the second combination ratio α 311, and outputs the second combination ratio α 311 to the second combination unit 306.

Next, the process performed by the first combination unit 305 will be described.

As illustrated in FIG. 16, the first combination unit 305 performs the process of combining the short-wave infrared image 154 and the visible image 153 which are the reference images and outputs the first composite signal (guide signal) 312 which is a composite image of the short-wave infrared image 154 and the visible image 153 to the second combination unit 306.

The process performed by the first combination unit 305 will be described in detail with reference to FIG. 19.

Figure 19:
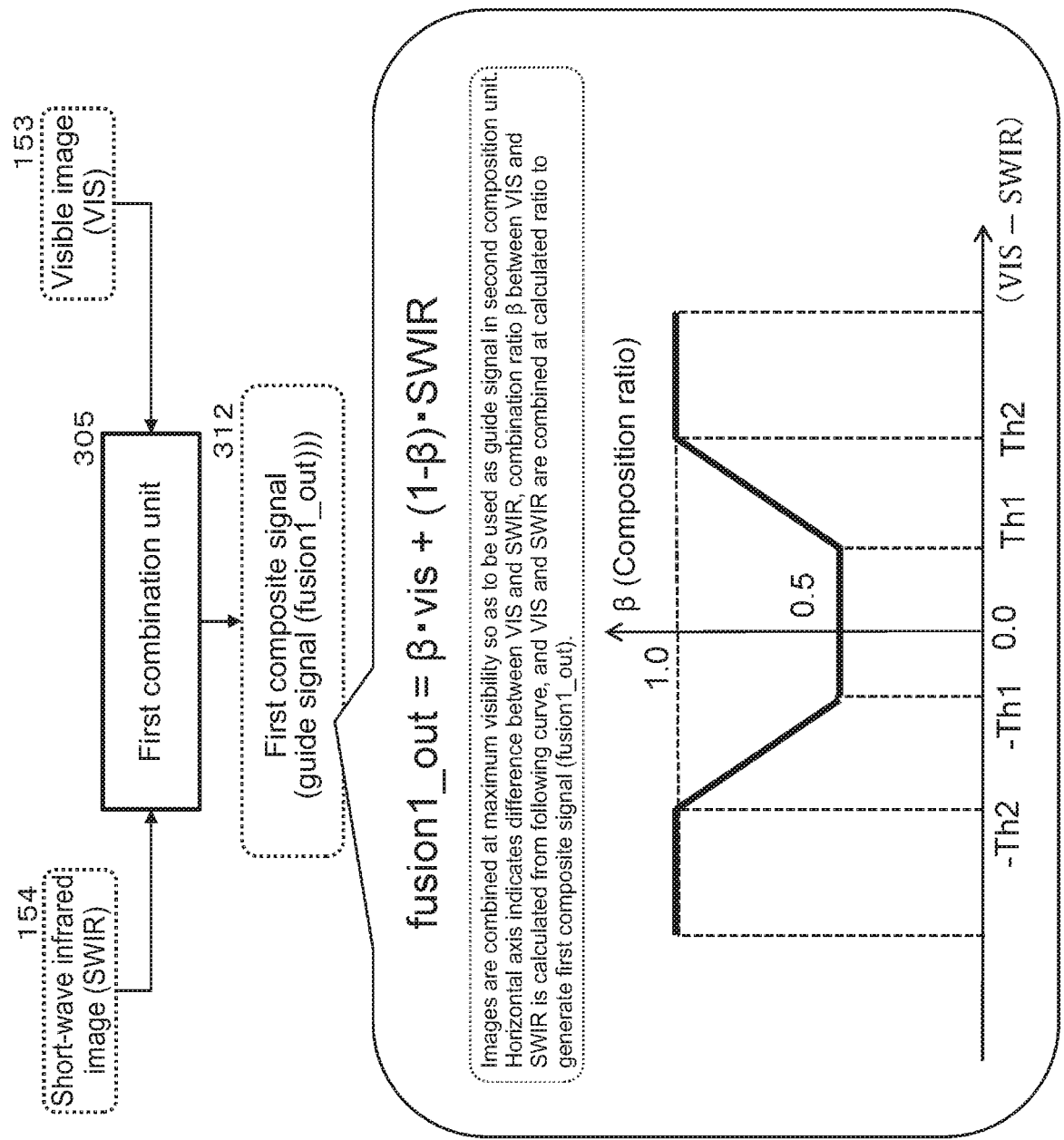
FIG. 19 is a diagram illustrating a process performed by a first combination unit.

As illustrated in FIG. 19, the first combination unit 305 receives the short-wave infrared image 154 and the visible image 153.

The first combination unit 305 performs the process of combining the short-wave infrared image 154 and the visible image 153 using a combination ratio β which has been defined in advance in a maximum visibility image generation algorithm to generate the first composite signal (guide signal) 312 which is a composite image.

The generated first composite signal (guide signal) 312 is output to the second combination unit 306.

The first composite signal (guide signal) 312 generated by the first combination unit 305 is, for example, a composite image of the short-wave infrared image 154 and the visible image 153 generated using the combination ratio β defined by the graph illustrated in FIG. 19.

In the graph illustrated in FIG. 19, the horizontal axis is (VIS-SWIR), that is, the difference between the pixel values (brightness values) of the corresponding pixels in the visible image and the short-wave infrared image.

The vertical axis is the combination ratio β.

This graph defines the combination ratio in a case in which two images are combined in accordance with the maximum visibility image generation algorithm.

The combination ratio β is 1.0 in a case in which VIS-SWIR is equal to or greater than Th2. The combination ratio β is in the range of 0.5 to 1.0 in a case in which VIS-SWIR is in the range of Th1 to Th2. The combination ratio β is 0.5 in a case in which VIS-SWIR is in the range of −Th1 to Th1. The combination ratio β is in the range of 1.0 to 0.5 in a case in which VIS-SWIR is in the range of −Th2 to −Th1. The combination ratio β is 1 in a case in which VIS-SWIR is equal to or less than −Th2.

The first combination unit 305 generates the first composite signal (guide signal (fusion1_out)) 312 using the following expression for image generation according to the maximum visibility image generation algorithm:

$$\text{fusion1\_out} = \beta(\text{VIS}) + (1-\beta)(\text{SWIR}).$$

In the above-mentioned expression, β is a combination ratio, VIS is a pixel value (brightness value) of a visible image, and SWIR is a pixel value (brightness value) of a short-wave infrared image.

As such, the first combination unit 305 performs the process of combining the short-wave infrared image 154 and the visible image 153 in accordance with the maximum visibility image combination algorithm to generate the first composite signal (guide signal (fusion1_out)) 312 which is a composite image.

The generated first composite signal (guide signal) 312 is output to the second combination unit 306.

As illustrated in FIG. 16, the second combination unit 306 receives the far-infrared image 151, the second combination ratio α 311, and the first composite signal (guide signal) 312, generates the high-quality far-infrared image 180, and outputs the high-quality far-infrared image 180.

The process performed by the second combination unit 306 will be described in detail with reference to FIG. 20.

Figure 20:
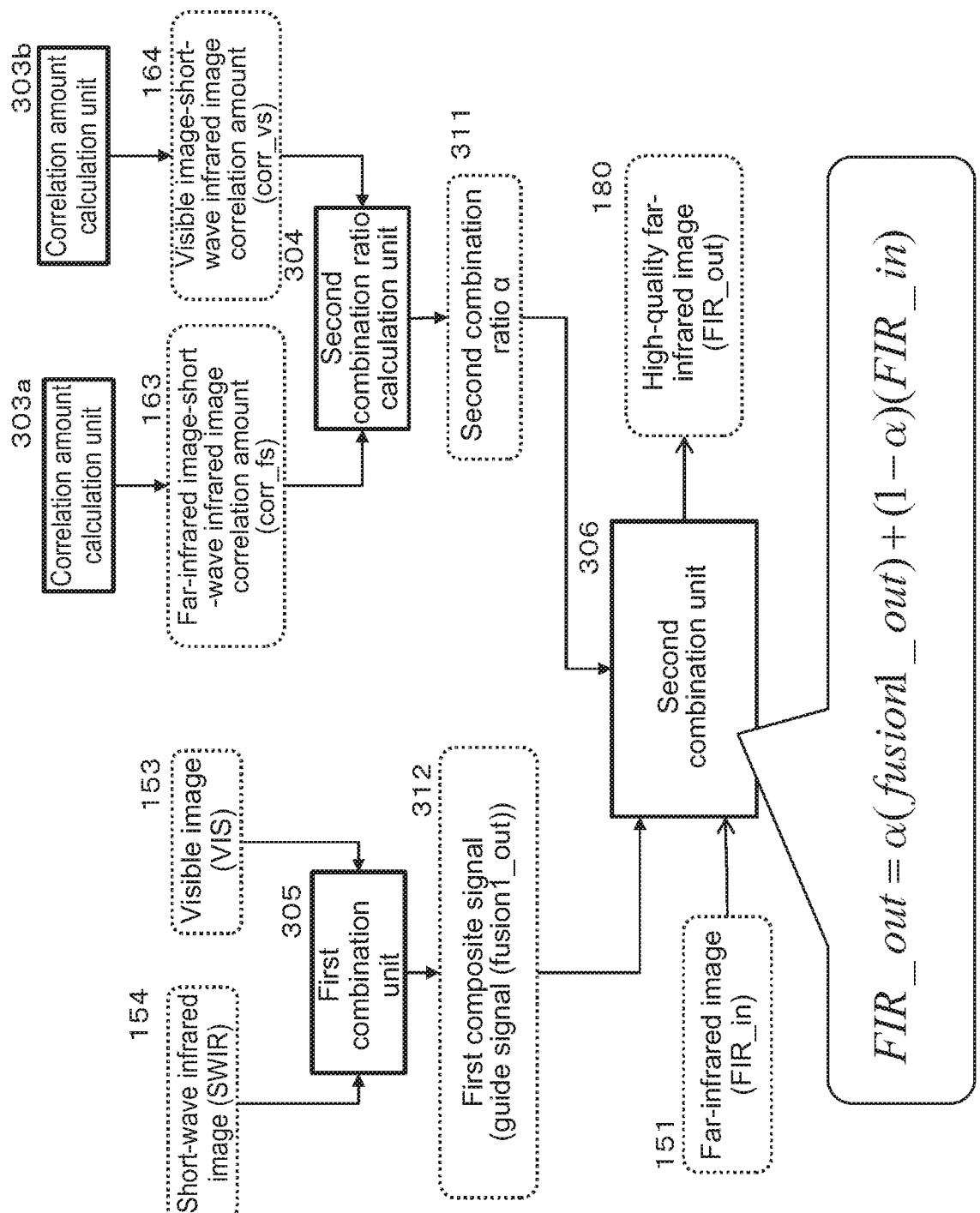
FIG. 20 is a diagram illustrating a process performed by a second combination unit.

As illustrated in FIG. 20, the second combination unit 206 receives the following signals and outputs the high-quality far-infrared image (FIR_out) 180:

(a) The first composite signal (guide signal (fusion1_out)) 312 from the first combination unit 305;

(b) The second combination ratio α 311 from the second combination ratio calculation unit 304; and (c) The far-infrared image (FIR_in) 151 which is the image to be corrected.

The first composite signal (guide signal (fusion1_out)) 312 input from the first combination unit 305 corresponds to a composite image of the short-wave infrared image 154 and the visible image 153 which are the reference images.

The second combination ratio α 311 input from the second combination ratio calculation unit 304 is the combination ratio of the first composite signal (guide signal (fusion1_out)) 312 in the image combination process of the second combination unit 306, that is, the process of combining the far-infrared image (FIR_in) 151 and the first composite signal (guide signal (fusion1_out)) 312.

As described above, the second combination unit 306 generates a high-quality far-infrared image (FIR_out) in accordance with the following expression:

$$(\text{FIR\_out}) = \alpha(\text{fusion1\_out}) + (1-\alpha)(\text{FIR\_in}).$$

In the above-mentioned expression, FIR_out is a pixel value (brightness value) of a high-quality far-infrared image, fusion1_out is the first composite signal (guide signal), FIR_in is a pixel value (brightness value) of the far-infrared image which is an input image to be corrected, and α is the second combination ratio.

Note that the second combination ratio α 311 input from the second combination ratio calculation unit 304 or the first composite signal (guide signal (fusion1_out)) 312 input from the first combination unit 305 is input as a signal for each local region, for example, each 7×7 pixel region in the image and the pixel values are generated for each predetermined region in accordance with the above-mentioned expression.

As described above, the first composite signal (guide signal (fusion1_out)) 312 input from the first combination unit 305 is a composite image generated by combining the visible image and the short-wave infrared image which are the reference images in accordance with the maximum visibility image combination algorithm.

In addition, the second combination ratio α 311 input from the second combination ratio calculation unit 304 is a combination ratio set on the basis of the difference between the correlation amount of the far-infrared image and the short-wave infrared image (corr_fs) 163 and the correlation amount of the visible image and the short-wave infrared image (corr_vs) 164 and becomes closer to 1 as the correlation amount of the far-infrared image and the short-wave infrared image (corr_fs) becomes larger.

That is, as the correlation amount of the far-infrared image and the short-wave infrared image (corr_fs) becomes larger, the second combination unit 306 sets, as the pixel value of the high-quality far-infrared image (FIR_out) 180, a pixel value with a higher contribution ratio in the first composite signal (guide signal (fusion1_out)) 312 corresponding to a composite image of the visible image and the short-wave infrared image which are the reference images.

The values of the pixels forming the far-infrared image (FIR_in) 151 which is the image to be corrected are corrected by the above-mentioned process on the basis of the pixel values of the short-wave infrared image or the visible image which is the reference image and the quality of the far-infrared image (FIR_in) 151 is improved.

6. For Process Sequence Performed by Image Processing Apparatus Performing According to Second Embodiment Next, the sequence of the process performed by the image processing unit illustrated in FIG. 16, that is, the sequence of the process of improving the quality of the far-infrared image using the visible image and the short-wave infrared image as the reference images will be described with reference to a flowchart illustrated in FIG. 21.

Figure 21:
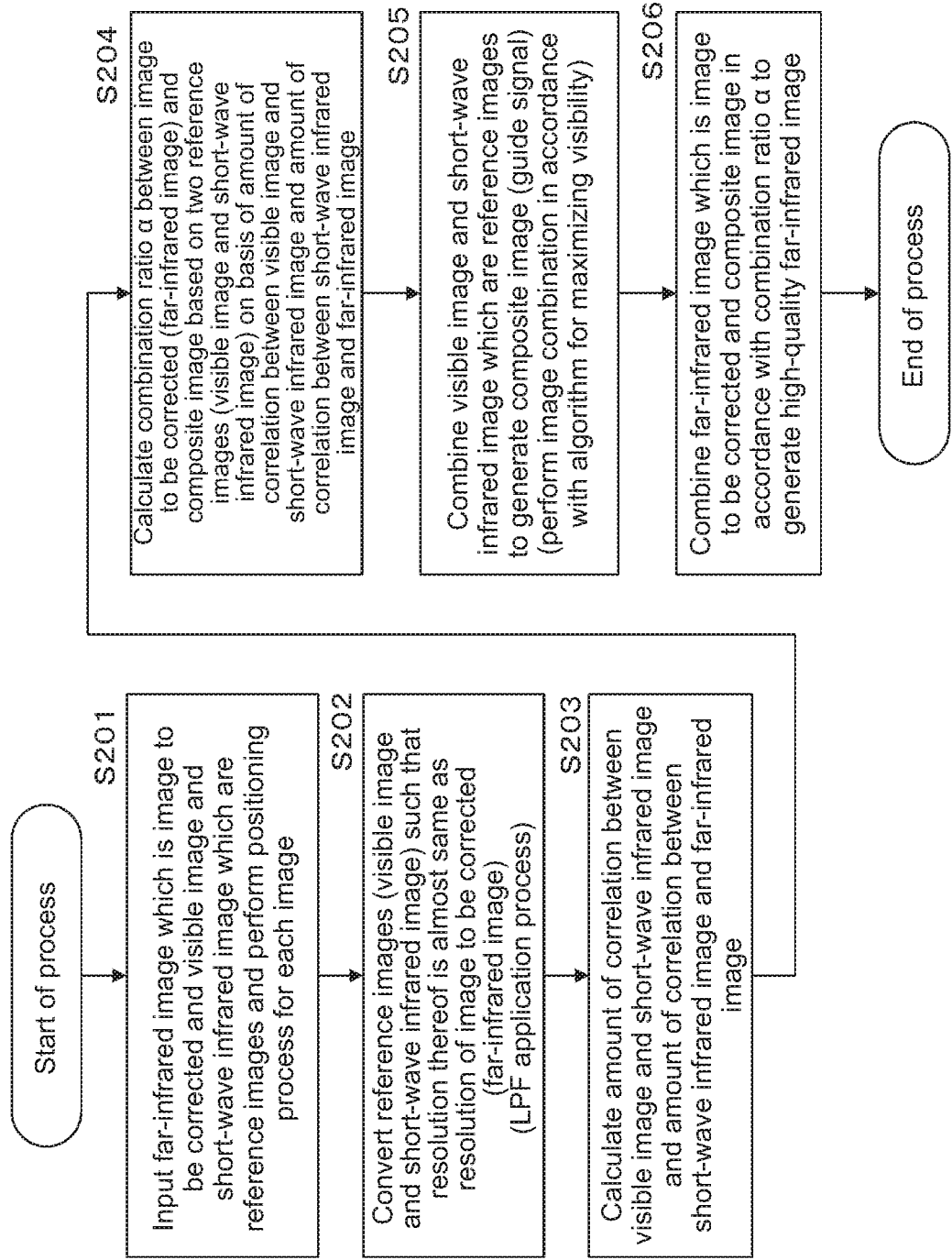
FIG. 21 is a flowchart illustrating an image processing sequence performed by an image processing apparatus.

For example, the process according to the flow illustrated in FIG. 21 is performed in accordance with the program stored in the storage unit of the image processing apparatus under the control of the control unit with a program execution function.

Hereinafter, processes in each step of the flow illustrated in FIG. 21 will be sequentially described.

(Step S201)

First, in Step S201, the image processing apparatus receives the far-infrared image which is the image to be corrected and the visible image and the short-wave infrared image which are the reference images and performs a process of positioning each image.

This process is the process performed by the image positioning unit 301 of the image processing unit 120 illustrated in FIG. 16.

The image positioning unit 301 performs the image positioning process for three types of input images such that the same object is located at the same position.

Note that the image positioning is performed by the existing process, for example, a process using the amount of disparity of each image or a motion vector.

(Step S202)

Then, in Step S202, the image processing apparatus converts the visible image and the short-wave infrared image which are the reference images such that the resolution thereof is substantially equal to the resolution of the far-infrared image which is the image to be corrected. That is, the image processing apparatus performs a process of applying an LPF to reduce the resolution.

This process is the process performed by the low-pass filters (LPFs) 302a and 302b of the image processing unit 120 illustrated in FIG. 16.

The low-pass filters (LPFs) 302a and 302b perform the resolution adjustment process of reducing the resolution level of the short-wave infrared image and the visible image which are the reference images to the resolution level of the far-infrared image which is the image to be corrected.

(Step S303)

Then, in Step S303, the image processing apparatus calculates the amount of correlation between two images having wavelengths close to each other, for example, the amount of correlation between the far-infrared image which is the image to be corrected and the short-wave infrared image which is the reference image and the amount of correlation between the visible image and the short-wave infrared image which are the reference images.

This process is the process performed by the correlation amount calculation units 303a and 303b of the image processing unit 120 illustrated in FIG. 16.

The correlation amount calculation unit 303a of the image processing unit 120 illustrated in FIG. 5 calculates the amount of correlation between the far-infrared image which is the image to be corrected and the short-wave infrared image which is the reference image and whose resolution has been reduced to almost the same resolution as that of the far-infrared image.

For example, the correlation amount calculation unit 303a calculates zero mean normalized cross correlation (ZNCC) as the amount of correlation for each predetermined local region (for example, 7×7 pixels).

In addition, the correlation amount calculation unit 303b of the image processing unit 120 illustrated in FIG. 16 calculates the amount of correlation between the visible image and the short-wave infrared image which are the reference image and whose resolution has been reduced to almost the same resolution as that of the far-infrared image 151.

For example, the correlation amount calculation unit 303b calculates zero mean normalized cross correlation (ZNCC) as the amount of correlation for each predetermined local region (for example, 7×7 pixels).

(Step S204)

Then, in Step S104, the image processing apparatus calculates the combination ratio of the first composite signal (guide signal) 312 that is a composite image based on the far-infrared image which is the image to be corrected and two reference images (the visible image and the short-wave infrared image) in accordance with two amounts of correlation, that is, the amount of correlation between the visible image and the short-wave infrared image which are the reference images and the amount of correlation between the short-wave infrared image which is the reference image and the far-infrared image which is the image to be corrected.

This process is the process performed by the second combination ratio calculation unit 304 of the image processing unit 120 illustrated in FIG. 16.

As described with reference to FIG. 17, the second combination ratio calculation unit 304 receives two amounts of correlation from the correlation amount calculation units 303a and 303b, generates the second combination ratio α 311, and outputs the second combination ratio α 311 to the second combination unit 306.

As described with reference to FIGS. 17 and 18, for example, the second combination ratio calculation unit 304 calculates the second combination ratio α 311 on the basis of half of the difference between the following input values in accordance with the graph illustrated in FIG. 18:

(a) The far-infrared image-short-wave infrared image correlation amount (corr_fs) 163; and (b) The visible image-short-wave infrared image correlation amount (corr_vs) 164.

For example, in a case in which (a) the far-infrared image-short-wave infrared image correlation amount (corr_fs) 163 is greater than (b) the visible image-short-wave infrared image correlation amount (corr_vs) 164, the second combination ratio calculation unit 304 calculates a combination ratio set to increase the contribution ratio of the first composite signal (guide signal) 312 which is a composite image of the reference images (the visible image and the short-wave infrared image) generated by the first combination unit 305 in the combination process of the second combination unit 306.

(Step S205)

Then, in Step S205, the image processing apparatus generates the first composite signal (guide signal) 312 that is a composite image of the visible image and the short-wave infrared image which are the reference images.

This process is the process performed by the first combination unit 305 of the image processing unit 120 illustrated in FIG. 16.

As described with reference to FIG. 19, the first combination unit 305 performs the process of combining the short-wave infrared image 154 and the visible image 153 using the combination ratio β which has been defined in advance in the maximum visibility image generation algorithm to generate the first composite signal (guide signal) 312 which is a composite image.

The generated first composite signal (guide signal) 312 is output to the second combination unit 306.

The first composite signal (guide signal) 312 generated by the first combination unit 305 is, for example, a composite image of the short-wave infrared image 154 and the visible image 153 generated using the combination ratio β defined by the graph illustrated in FIG. 19.

(Step S206)

Then, in Step S206, the image processing apparatus combines the far-infrared image which is the image to be corrected and the composite signal (guide signal) in accordance with the combination ratio calculated in Step S204 to generate a high-quality far-infrared image.

This process is the process performed by the second combination unit 306 of the image processing unit 120 illustrated in FIG. 16.

As described with reference to FIG. 20, the second combination unit 306 receives the following signals and outputs the high-quality far-infrared image (FIR_out) 180:

(a) The first composite signal (guide signal (fusion1_out)) 312 from the first combination unit 305;

(b) The second combination ratio α 311 from the second combination ratio calculation unit 304; and (c) The far-infrared image (FIR_in) 151 which is the image to be corrected.

The first composite signal (guide signal (fusion1_out)) 312 input from the first combination unit 305 corresponds to a composite image of the short-wave infrared image 154 and the visible image 153 which are the reference images.

The second combination ratio α 311 input from the second combination ratio calculation unit 304 is the combination ratio of the first composite signal (guide signal (fusion1_out)) 312 in the image combination process of the second combination unit 306, that is, the process of combining the far-infrared image (FIR_in) 151 and the first composite signal (guide signal (fusion1_out)) 312.

As described above, the second combination unit 306 generates the high-quality far-infrared image (FIR_out) in accordance with the following expression:

$$(FIR\_out) = \alpha(fusion1\_out) + (1-\alpha)(FIR\_in).$$

In the above-mentioned expression, FIR_out is a pixel value (brightness value) of a high-quality far-infrared image, fusion1_out is the first composite signal (guide signal), FIR_in is a pixel value (brightness value) of the far-infrared image which is an input image to be corrected, and α is the second combination ratio.

Note that the second combination ratio α 311 input from the second combination ratio calculation unit 304 or the first composite signal (guide signal (fusion1_out)) 312 input from the first combination unit 305 is input as a signal for each local region, for example, each 7×7 pixel region in the image and the pixel values are generated for each predetermined region in accordance with the above-mentioned expression.

As the correlation amount of the far-infrared image and the short-wave infrared image (corr_fs) becomes larger, the second combination unit 306 sets, as the pixel value of the high-quality far-infrared image (FIR_out) 180 to be output, a pixel value with a higher contribution ratio in an element (the first composite signal (guide signal (fusion1_out)) 312) of a composite image of the visible image and the short-wave infrared image which are the reference images.

The values of the pixels forming the far-infrared image (FIR_in) 151 which is the image to be corrected are corrected by the above-mentioned process on the basis of the pixel values of the short-wave infrared image or the visible image which is the reference image and the quality of the far-infrared image (FIR_in) 151 is improved.

7. For Characteristics of Far-Infrared Image, Visible Image, and Short-Wave Infrared Image and Availability of Quality-Improved Image of Far-Infrared Image Next, the characteristics of a far-infrared image, a visible image, and a short-wave infrared image and the availability of a quality-improved image of the far-infrared image will be described.

In the above-described embodiment, the configuration and process of the image processing apparatus that generates a high-resolution and high-quality far-infrared image, using the far-infrared image which is a low-quality image, such as a low-resolution image, as the image to be corrected and the visible image or the short-wave infrared image which is a high-quality image as the reference image have been described.

The characteristics of each of the images used in the above-described embodiment, that is, the far-infrared image, the visible image, and the short-wave infrared image will be described with reference to FIG. 22.

FIG. 22 is a diagram illustrating the characteristics of the visible image, the short-wave infrared image, and the far-infrared image.

The characteristics of the visible image, the short-wave infrared image, and the far-infrared image are shown for each of the following items:

(1) Whether temperature information can be acquired;
(2) Whether object information can be acquired in a dark environment;
(3) Whether object information can be acquired in a bright environment;
(4) Whether object information can be acquired in a distant view;
(5) Whether object information can be acquired in a near view;
(6) Whether pattern information of, for example, a printed matter can be acquired; and
(7) Whether a high-resolution image can be acquired.

The visible image has the characteristics that it is impossible or difficult to process two items (1) and (2) and the other items (3) to (7) are OK (○), that is, available.

The short-wave infrared image has the characteristics that it is impossible or difficult to process two items (1) and (6) and the other items (2) to (5) and (7) are OK (○), that is, available.

In addition, the far-infrared image has the characteristics that it is impossible or difficult to process two items (6) and (7) and the other items (1) to (5) are OK (○), that is, available.

As described above, for the far-infrared image, it is difficult to acquire a high-resolution image or the pattern of a printed matter, but it is possible to detect, for example, the image of an object with temperature, for example, a person. In addition, it is possible to detect a person or a high-temperature car, regardless of whether there is ambient light, a near view, or a distant view. For example, an in-vehicle camera is used to present the driver with the information of a person or a vehicle ahead.

In addition, the resolution improvement process according to the above-described embodiment is performed to display clearer image information of a person or a vehicle.

Note that the far-infrared image is used as the image to be corrected and the visible image and the near-infrared image are used as the reference images in Embodiment 1; and the far-infrared image is used as the image to be corrected and the visible image and the short-wave infrared image are used as the reference images in Embodiment 2.

The combinations of the image to be corrected and the reference images are not limited thereto and various other combinations of images may be used.

As long as the reference image with a higher resolution than the image to be corrected is used, the configuration according to the present disclosure can be used to perform the process of improving the quality of the image to be corrected.

8. For Example of Hardware Configuration of Image Processing Apparatus

Next, an example of the hardware configuration of the image processing apparatus will be described with reference to FIG. 23.

Figure 23:
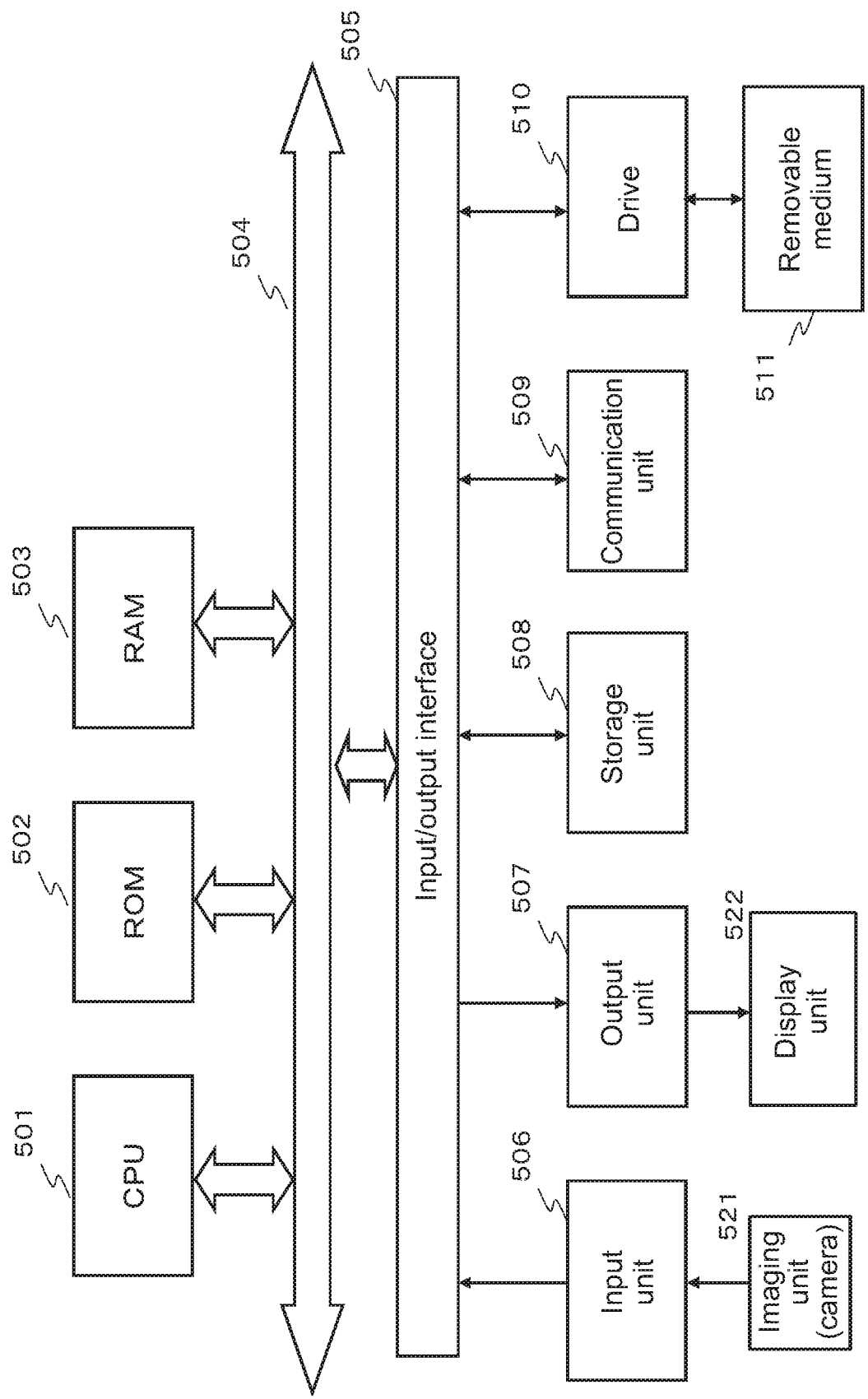
FIG. 23 is a diagram illustrating the hardware configuration of the image processing apparatus.

FIG. 23 is a diagram illustrating an example of the hardware configuration of the image processing apparatus that performs the process according to the present disclosure.

A central processing unit (CPU) 501 functions as a control unit or a data processing unit that performs various processes in accordance with a program stored in a read only memory (ROM) 502 or a storage unit 508. For example, the CPU 501 performs the process according to the sequence described in the above-mentioned embodiment. A random access memory (RAM) 503 stores, for example, programs or data executed by the CPU 501. The CPU 501, the ROM 502, and the RAM 503 are connected to each other by a bus 504.

The CPU 501 is connected to an input/output interface 505 through the bus 504. An input unit 506 that inputs an image captured by an imaging unit 521 and includes various switches, a keyboard, a mouse, and a microphone which can be used by the user to input information and an output unit 507 that outputs data to, for example, a display unit 522 or a speaker are connected to the input/output interface 505. The CPU 501 performs various processes in response to commands input from the input unit 506 and outputs the processing results to, for example, the output unit 507.

The storage unit 508 connected to the input/output interface 505 is, for example, a hard disk drive and stores the programs or various types of data executed by the CPU 501. A communication unit 509 functions as a transmitting and receiving unit for Wi-Fi communication, Bluetooth (registered trademark) (BT) communication, and other types of data communication through a network, such as the Internet or a local area network, and communicates with external apparatuses.

A drive 510 connected to the input/output interface 505 drives a removable medium 511, such as a magnetic disk, an optical disk, a magneto-optical disk, or a semiconductor memory such as a memory card, to record or read data.

9. For Application Examples of Image Processing Apparatus According to Present Disclosure The technology according to the present disclosure can be applied to various products. For example, the technology according to the present disclosure may be implemented as an apparatus provided in any type of moving object such as a vehicle, an electric vehicle, a hybrid electric vehicle, a motorcycle, a bicycle, a personal mobility, an airplane, a drone, a ship, a robot, a construction machine, and an agricultural machine (tractor).

Figure 24:
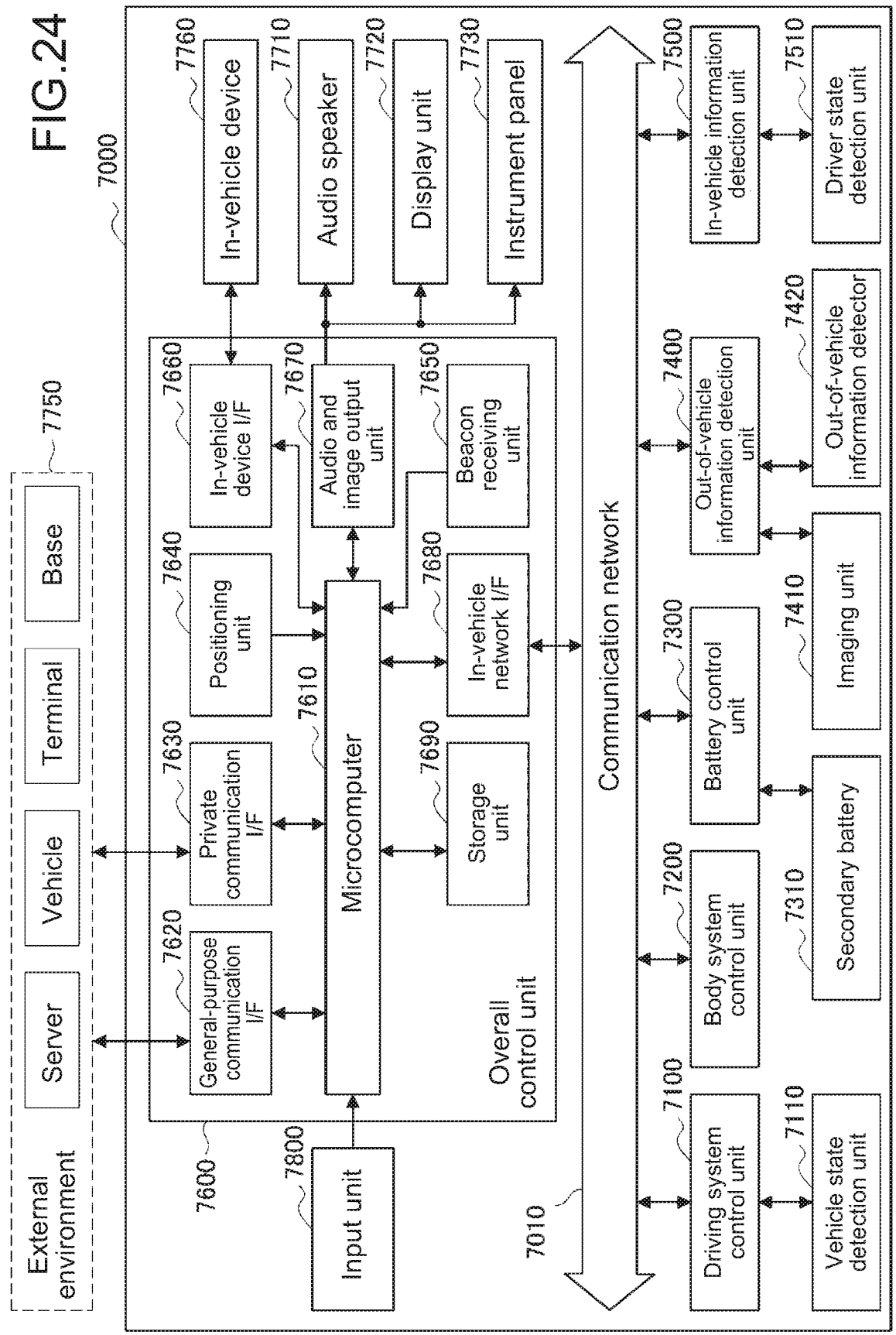
FIG. 24 is a block diagram illustrating an example of the schematic configuration of a vehicle control system.

FIG. 24 is a block diagram illustrating an example of the schematic configuration of a vehicle control system 7000 that is an example of a moving object control system to which the technology according to the present disclosure can be applied. The vehicle control system 7000 includes multiple electronic control units connected through a communication network 7010. In the example illustrated in FIG. 24, the vehicle control system 7000 includes a driving system control unit 7100, a body system control unit 7200, a battery control unit 7300, an out-of-vehicle information detection unit 7400, an in-vehicle information detection unit 7500, and an overall control unit 7600. The communication network 7010 connecting the multiple control units may be an in-vehicle communication network based on any standard, such as a controller area network (CAN), a local interconnect network (LIN), a local area network (LAN), or FlexRay (registered trademark).

Each control unit includes a microcomputer that performs an arithmetic process in accordance with various programs, a storage unit that stores, for example, programs executed by the microcomputer or parameters used for various arithmetic operations, and a driving circuit that drives various apparatuses to be controlled. Each control unit includes a network I/F for communication with other control units through the communication network 7010 and a communication I/F for wired communication or wireless communication with apparatuses or sensors inside or outside the vehicle. In FIG.

24, a microcomputer 7610, a general-purpose communication I/F 7620, a private communication I/F 7630, a positioning unit 7640, a beacon receiving unit 7650, an in-vehicle device I/F 7660, an audio and image output unit 7670, an in-vehicle network I/F 7680, and a storage unit 7690 are illustrated as the functional configurations of the overall control unit 7600. Similarly, the other control units include, for example, a microcomputer, a communication I/F, and a storage unit.

The driving system control unit 7100 controls the operation of devices related to a vehicle driving system in accordance with various programs. For example, the driving system control unit 7100 functions as a control device for a driving force generation device for generating the driving force of the vehicle, such as an internal combustion engine or a driving motor, a driving force transmission mechanism for transmitting the driving force to wheels, a steering mechanism for adjusting the steering of the vehicle, and a braking device for generating the braking force of the vehicle. The driving system control unit 7100 may function as a control device for an antilock brake system (ABS) or an electronic stability control (ESC) device.

A vehicle state detection unit 7110 is connected to the driving system control unit 7100. The vehicle state detection unit 7110 may include, for example, at least one of a gyro sensor that detects an angular velocity in the axial rotational motion of a vehicle body, an acceleration sensor that detects the acceleration of the vehicle, or a sensor for detecting the operation amount of an accelerator pedal, the operation amount of a brake pedal, the steering angle of a steering wheel, an engine speed, or the rotational speed of the wheels. The driving system control unit 7100 performs an arithmetic process using a signal input from the vehicle state detection unit 7110 to control, for example, the internal combustion engine, the driving motor, an electric power steering device, or the braking device.

The body system control unit 7200 controls the operation of various devices provided in the vehicle body in accordance with various programs. For example, the body system control unit 7200 functions as a control device for a keyless entry system, a smart key system, a power window device, and various lamps such as a head lamp, a back lamp, a brake lamp, a blinker, and a fog lamp. In this case, the body system control unit 7200 may receive radio waves transmitted from a portable device substituting a key or signals from various switches. The body system control unit 7200 receives the input radio waves or signals and controls, for example, a door lock device, a power window device, and lamps of the vehicle.

The battery control unit 7300 controls a secondary battery 7310 which is a power supply source of the driving motor in accordance with various programs. Information, such as a battery temperature, a battery output voltage, or the remaining capacity of the battery, is input from a battery device provided with the secondary battery 7310 to the battery control unit 7300. The battery control unit 7300 performs an arithmetic process using these signals to perform temperature adjustment control for the secondary battery 7310 or to control, for example, a cooling device provided in the battery device.

The out-of-vehicle information detection unit 7400 detects information outside the vehicle provided with vehicle control system 7000. For example, at least one of an imaging unit 7410 or the out-of-vehicle information detector 7420 is connected to the out-of-vehicle information detection unit 7400. The imaging unit 7410 includes at least one of a time-of-flight (ToF) camera, a stereo camera, a monocular camera, an infrared camera, or other cameras. The out-of-vehicle information detector 7420 includes at least one of an environment sensor for detecting the current weather or climate or a surrounding information detection sensor for detecting other vehicles, obstacles or pedestrians around the vehicle provided with the vehicle control system 7000.

The environment sensor may be, for example, at least one of a raindrop sensor that detects wet weather, a fog sensor that detects fog, a sunshine sensor that detects sunshine intensity, or a snow sensor that detects snowfall. The surrounding information detection sensor may be at least one of an ultrasonic sensor, a radar device, or a light detection and ranging or laser imaging detection and ranging (LIDAR) device. The imaging unit 7410 and the out-of-vehicle information detector 7420 may be provided as independent sensors or devices or may be provided as devices into which multiple sensors or devices are integrated.

Figure 25:
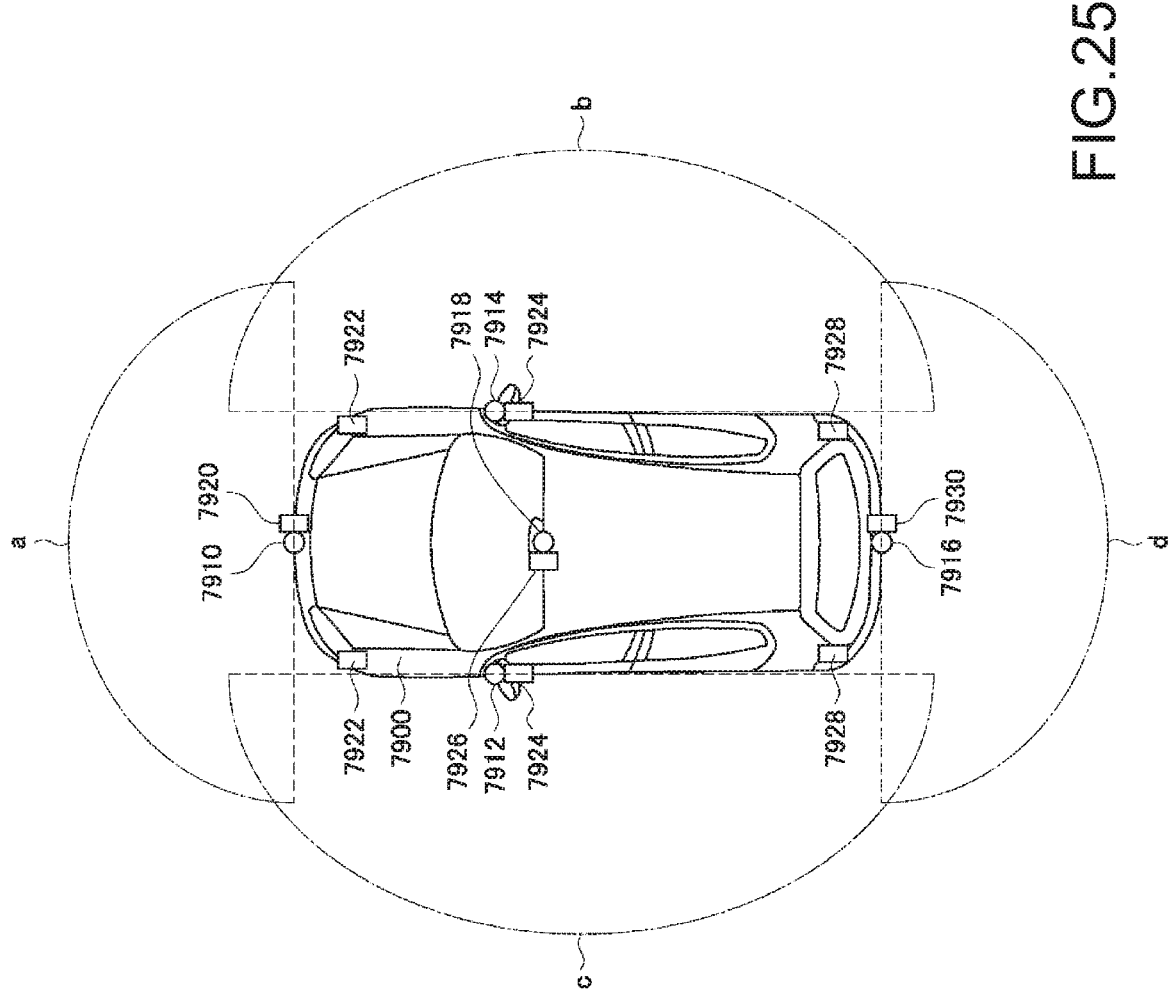
FIG. 25 is a diagram illustrating an example of the installation position of an out-of-vehicle information detection unit and an imaging unit.

Here, FIG. 25 illustrates an example of the installation position of the imaging unit 7410 and the out-of-vehicle information detector 7420. Imaging units 7910, 7912, 7914, 7916, and 7918 are provided, for example, in least one of a front nose, a side mirror, a rear bumper, a back door, or an inner upper part of a windshield of a vehicle 7900. The imaging unit 7910 provided in the front nose and the imaging unit 7918 provided in the inner upper part of the windshield of the vehicle mainly acquire images in front of the vehicle 7900. The imaging units 7912 and 7914 provided in the side mirrors main acquire images on the side of the vehicle 7900. The imaging unit 7916 provided in the rear bumper or the back door mainly acquires an image behind the vehicle 7900. The imaging unit 7918 provided in the inner upper part of the windshield of the vehicle is mainly used to detect, for example, vehicles in front, pedestrians, obstacles, traffic lights, traffic signs, and lanes.

It should be noted that FIG. 25 illustrates an example of the imaging range of each of the imaging units 7910, 7912, 7914, and 7916. An imaging range a indicates the imaging range of the imaging unit 7910 provided in the front nose, imaging ranges b and c indicate the imaging ranges of the imaging units 7912 and 7914 provided in the side mirrors, respectively, and an imaging range d indicates the imaging range of the imaging unit 7916 provided in the rear bumper or the back door. For example, image data captured by the imaging units 7910, 7912, 7914, and 7916 is superimposed to obtain a bird's-eye view image of the vehicle 7900.

Out-of-vehicle information detection units 7920, 7922, 7924, 7926, 7928, and 7930 provided on the front, rear, side, and corners of the vehicle 7900 and in the upper part of the windshield in the vehicle may be, for example, ultrasonic sensors or radar devices. The out-of-vehicle information detection units 7920, 7926, and 7930 provided in the front nose, the rear bumper, and the back door of the vehicle 7900 and in the upper part of the windshield in the vehicle may be, for example, LIDAR devices. These out-of-vehicle information detection units 7920 to 7930 are mainly used to detect, for example, vehicles in front, pedestrians, and obstacles.

Returning to FIG. 24, the description will be continued. The out-of-vehicle information detection unit 7400 directs the imaging unit 7410 to capture an image outside the vehicle and receives the captured image data. In addition, the out-of-vehicle information detection unit 7400 receives information output from the out-of-vehicle information detector 7420 connected thereto. In a case in which the out-of-vehicle information detector 7420 is an ultrasonic sensor, a radar device, or a LIDAR device, the out-of-vehicle information detection unit 7400 transmits, for example, ultrasonic waves or radio waves and receives information of received reflected waves. The out-of-vehicle information detection unit 7400 may perform an object detection process or a distance detection process for, for example, persons, vehicles, obstacles, signs, and characters on a road surface on the basis of the received information. The out-of-vehicle information detection unit 7400 may perform an environment recognition process for recognizing, for example, rainfall, fog, and road surface conditions on the basis of the received information. The out-of-vehicle information detection unit 7400 may calculate the distance to an object outside the vehicle on the basis of the received information.

Further, the out-of-vehicle information detection unit 7400 may perform an image recognition process or a distance detection process that recognizes, for example, persons, vehicles, obstacles, signs, and characters on a road surface on the basis of the received image data. The out-of-vehicle information detection unit 7400 may perform a process, such as distortion correction or positioning, for the received image data and may combine the image data captured by different imaging units 7410 to generate a bird's eye view image or a panoramic image. The out-of-vehicle information detection unit 7400 may perform a viewpoint conversion process using the image data captured by different imaging units 7410.

The in-vehicle information detection unit 7500 detects information in the vehicle. For example, a driver state detection unit 7510 that detects the state of a driver is connected to the in-vehicle information detection unit 7500. The driver state detection unit 7510 may include, for example, a camera that captures an image of the driver, a biological sensor that detects the biological information of the driver, and a microphone that collects sound in the vehicle. The biological sensor is provided, for example, on the surface of a seat or a steering wheel and detects the biological information of a passenger sitting on the seat or the driver who grips the steering wheel. The in-vehicle information detection unit 7500 may calculate the degree of fatigue or concentration of the driver on the basis of the detection information input from the driver state detection unit 7510 or may determine whether the driver falls sleep. The in-vehicle information detection unit 7500 may perform a process, such as a noise canceling process, for the collected audio signal.

The overall control unit 7600 controls the overall operation of the vehicle control system 7000 in accordance with various programs. An input unit 7800 is connected to the overall control unit 7600. The input unit 7800 is implemented by, for example, a device that can be operated to input information by the passenger, such as a touch panel, a button, a microphone, a switch, or a lever. For example, data obtained by voice recognition for voice input by the microphone may be input to the overall control unit 7600. The input unit 7800 may be, for example, a remote control device using infrared rays or other radio waves or an external connection device, such as a mobile phone or a personal digital assistant (PDA) corresponding to the operation of the vehicle control system 7000. The input unit 7800 may be, for example, a camera. In this case, the passenger can input information by gesture. Alternatively, data obtained by detecting the movement of a wearable device worn by the passenger may be input. In addition, the input unit 7800 may include, for example, an input control circuit that generates an input signal on the basis of information input by the passenger through the input unit 7800 and outputs the generated signal to the overall control unit 7600. For example, the passenger operates the input unit 7800 to input various types of data to the vehicle control system 7000 or to instruct a processing operation.

The storage unit 7690 may include a read only memory (ROM) that stores various program executed by a microcomputer and a random access memory (RAM) that stores, for example, various parameters, the result of computation, and sensor values. In addition, the storage unit 7690 may be implemented by a magnetic storage device, such as a hard disk drive (HDD), a semiconductor storage device, an optical storage device, or a magneto-optical storage device.

The general-purpose communication I/F 7620 is a general-purpose communication I/F that relays communication with various apparatuses in an external environment 7750. The general-purpose communication I/F 7620 may be implemented by a cellular communication protocol, such as Global System of Mobile communications (GSM) (registered trademark), WiMAX, long term evolution (LTE), or LTE-advanced (LTE-A), or other wireless communication protocols, such as a wireless LAN (also referred to as Wi-Fi (registered trademark)) and Bluetooth (registered trademark). The general-purpose communication I/F 7620 may be connected to an apparatus (for example, an application server or a control server) on an external network (for example, the Internet, a cloud network, or an operator-specific network) through, for example, a base station or an access point. In addition, the general-purpose communication I/F 7620 may be connected to a terminal (for example, a terminal of a driver, a pedestrian, or a shop, or a machine type communication (MTC) terminal) in the vicinity of the vehicle by, for example, a peer-to-peer (P2P) technology.

The private communication I/F 7630 is a communication I/F that supports a communication protocol designed for use in vehicles. The private communication I/F 7630 may be implemented by a standard protocol, such as wireless access in vehicle environment (WAVE) or dedicated short range communications (DSRC) that is a combination of IEEE 802.11p which is a lower layer and IEEE1609 which is an upper layer, or a cellular communication protocol. The private communication I/F 7630 typically performs V2X communication which is a concept including at least one of vehicle-to-vehicle communication, vehicle-to-infrastructure communication, vehicle-to-home communication, or vehicle-to-pedestrian communication.

The positioning unit 7640 receives, for example, a global navigation satellite system (GNSS) signal (for example, a global positioning system (GPS) signal from a GPS satellite) from a GNSS satellite, performs positioning, and generates positional information including the latitude, longitude, and altitude of the vehicle. It should be noted that the positioning unit 7640 may specify the current position by exchanging signals with a wireless access point or may acquire positional information from a terminal having a positioning function, such as a mobile phone, a PHS, or a smart phone.

The beacon receiving unit 7650 receives, for example, radio waves or electromagnetic waves transmitted from a wireless station installed on a road and acquires information, such as the current position, traffic jams, closure, or the time required. It should be noted that, the functions of the beacon receiving unit 7650 may be included in the private communication I/F 7630.

The in-vehicle device I/F 7660 is a communication interface that relays the connection between the microcomputer 7610 and various in-vehicle devices 7760 provided in the vehicle. The in-vehicle device I/F 7660 may establish a wireless connection using a wireless communication protocol, such as a wireless LAN, Bluetooth (registered trademark), near field communication (NFC), or wireless USB (WUSB). In addition, the in-vehicle device I/F 7660 may establish a wired connection, such as universal serial bus (USB), High-Definition Multimedia Interface (HDMI) (registered trademark), or mobile high-definition link (MHL), through a connection terminal (not illustrated) (and a cable if necessary). The in-vehicle device 7760 may include, for example, at least one of a mobile device or a wearable device of a passenger, or an information device carried in or attached to the vehicle. In addition, the in-vehicle device 7760 may include a navigation device that performs a route search to any destination. The in-vehicle device 7760 exchanges control signals or data signals with these in-vehicle devices 7760.

The in-vehicle network I/F 7680 is an interface that relays communication between the microcomputer 7610 and the communication network 7010. The in-vehicle network I/F 7680 transmits and receives, for example, signals in accordance with a predetermined protocol supported by the communication network 7010.

The microcomputer 7610 of the overall control unit 7600 controls the vehicle control system 7000 in accordance with various programs on the basis of the information acquired through at least one of the general-purpose communication I/F 7620, the private communication I/F 7630, the positioning unit 7640, the beacon receiving unit 7650, the in-vehicle device I/F 7660, or the in-vehicle network I/F 7680. For example, the microcomputer 7610 may calculate a control target value of the driving force generation device, the steering mechanism, or the braking device on the basis of the acquired information inside and outside the vehicle and may output a control command to the driving system control unit 7100. For example, the microcomputer 7610 may perform cooperative control for achieving the function of an advanced driver assistance system (ADAS) including, for example, collision avoidance or shock mitigation of a vehicle, follow-up traveling based on an inter-vehicle distance, vehicle speed maintenance traveling, vehicle collision warning, or vehicle lane departure warning. In addition, the microcomputer 7610 may control, for example, the driving force generation device, the steering mechanism, or the braking device on the basis of the acquired information related to the surroundings of the vehicle to perform cooperative control for the purpose of automatic driving for autonomous driving without depending on the driver's operation.

The microcomputer 7610 may generate three-dimensional distance information between the vehicle and an object, such as the surrounding structure or a person, on the basis of the information acquired through at least one of the general-purpose communication I/F 7620, the private communication I/F 7630, the positioning unit 7640, the beacon receiving unit 7650, the in-vehicle device I/F 7660, or the in-vehicle network I/F 7680 and generate local map information including information around the current position of the vehicle. In addition, the microcomputer 7610 may predict a danger, such as the collision of a vehicle, the approach of a pedestrian, or entrance to a closed road, and generate a warning signal on the basis of the acquired information. The warning signal may be, for example, a signal for generating a warning sound or for turning on a warning lamp.

The audio and image output unit 7670 transmits an output signal of at least one of audio or images to an output device that can visually or aurally notify information to a passenger of the vehicle or the outside of the vehicle. In the example illustrated in FIG. 24, an audio speaker 7710, a display unit 7720, and an instrument panel 7730 are illustrated as the output device. The display unit 7720 may include, for example, at least one of an on-board display or a head-up display. The display unit 7720 may have an augmented reality (AR) display function. The output device may be other devices including a headphone, a wearable device worn by a passenger, such as a glasses-type display, a projector, and a lamp in addition to these devices. In a case in which the output device is a display device, the display device visually displays the results obtained by various processes performed by the microcomputer 7610 or the information received from other control units in various formats, such as text, an image, a table, and a graph. In addition, in a case in which the output device is an audio output device, the audio output device converts an audio signal including the reproduced audio data or acoustic data into an analog signal and aurally outputs the analog signal.

It should be noted that, in the example illustrated in FIG. 24, at least two control units connected through the communication network 7010 may be integrated into one control unit. Alternatively, each control unit may be configured by multiple control units. In addition, the vehicle control system 7000 may include other control units (not illustrated). Further, in the above description, some or all of the functions of any control unit may be provided in other control units. That is, as long as information is transmitted and received through the communication network 7010, a predetermined arithmetic process may be performed by any control unit. Similarly, a sensor or a device connected to any control unit may be connected to other control units and multiple control units may mutually transmit and receive detection information through the communication network 7010.

It should be noted that a computer program for implementing each function of the image processing apparatus according to the above-described embodiment can be implemented in any control unit. In addition, a computer-readable recording medium having the computer program stored therein may be provided. The recording medium is, for example, a magnetic disk, an optical disk, a magneto-optical disk, or a flash memory. Further, the computer program may be distributed through, for example, network, without using the recording medium.

In the vehicle control system 7000 described above, the image processing apparatus according to the above-described embodiment can be applied to the overall control unit 7600 according to the application example illustrated in FIG. 24. For example, a CPU 801 of the image processing apparatus illustrated in FIG. 25 corresponds to the microcomputer 7610 of the overall control unit 7600 illustrated in FIG. 24, a ROM 802, a RAM 803, and a storage unit 808 of the image processing apparatus illustrated in FIG. 25 correspond to the storage unit 7690 of the overall control unit 7600 illustrated in FIG. 24, and a communication unit 809 of the image processing apparatus illustrated in FIG. 25 corresponds to the in-vehicle network I/F 7680 of the overall control unit 7600 illustrated in FIG. 24.

In addition, at least some of the components of the above-mentioned image processing apparatus may be implemented in a module (for example, an integrated circuit module configured by one die) for the overall control unit 7600 illustrated in FIG. 24. Alternatively, the above-mentioned image processing apparatus may be implemented by multiple control units of the vehicle control system 7000 illustrated in FIG. 24.

10. Summary of Configuration of Present Disclosure

The embodiments of the present disclosure have been described in detail above with reference to the specific embodiments. However, it is obvious that those skilled in the art can make modifications and substitutions of the embodiments without departing from the scope and spirit of the present disclosure. That is, the invention has been disclosed in the form of illustration and should not be construed as being limited to the embodiments. The claims need be referred to in order to determine the scope of the present disclosure.

Note that the technology disclosed in the specification can have the following configuration.

(1) An image processing apparatus including:
a first combination unit that receives a far-infrared image and multiple reference images obtained by capturing the same object as that of the far-infrared image and generates a first composite signal which is a composite signal of the multiple reference images; and
a second combination unit that performs a process of combining the far-infrared image and the first composite signal to generate a quality-improved image of the far-infrared image.

(2) The image processing apparatus according to (1), in which
the multiple reference images are a visible image and a near-infrared image.

(3) The image processing apparatus according to (2), in which
the first combination unit generates the first composite signal on the basis of an amount of correlation between the visible image and the far-infrared image and an amount of correlation between the near-infrared image and the far-infrared image, and
the first combination unit sets a contribution ratio of a reference image, which has a larger amount of correlation with the far-infrared image, of the two reference images, that is, the visible image and the near-infrared image to a large value and generates the first composite signal.

(4) The image processing apparatus according to (3), further including:
a low-pass filter that reduces a resolution of the visible image and the near-infrared image which are the reference images to a resolution level of the far-infrared image which is an image to be corrected; and
a correlation amount calculation unit that calculates an amount of correlation between each of a resolution-reduced visible image and a resolution-reduced near-infrared image generated by applying the low-pass filter and the far-infrared image, in which
the first combination unit performs a process of combining the visible image and the near-infrared image in accordance with a combination ratio determined on the basis of the amount of correlation calculated by the correlation amount calculation unit to generate the first composite signal.

(5) The image processing apparatus according to (4), in which
the correlation amount calculation unit calculates the amount of correlation for each local region of the image, and
the first combination unit performs the process of combining the visible image and the near-infrared image in units of the local regions in accordance with a combination ratio for each local region which is determined on the basis of the amount of correlation for each local region calculated by the correlation amount calculation unit to generate the first composite signal.

(6) The image processing apparatus according to (4) or (5), in which
the correlation amount calculation unit calculates zero mean normalized cross correlation (ZNCC).

(7) The image processing apparatus according to any one of (1) to (6), in which
the second combination unit includes:
a tap selection unit that determines a tap as a reference region used to correct a pixel value of the far-infrared image;
a correction parameter calculation unit that determines a correction parameter used to correct the pixel value of the far-infrared image; and
an image correction unit that corrects the pixel value of the far-infrared image using the tap determined by the tap selection unit and the correction parameter determined by the correction parameter determination unit.

(8) The image processing apparatus according to (7), in which
the correction parameter calculation unit determines the correction parameter on the basis of the first composite signal generated by the first combination unit.

(9) The image processing apparatus according to (8), in which
the correction parameter calculation unit determines the correction parameter on the basis of correspondence data between a correction parameter most suitable for a process of improving quality of the far-infrared image and the first composite signal, the correspondence data being acquired by a learning process.

(10) The image processing apparatus according to any one of (7) to (9), in which
the tap selection unit determines the tap as the reference region on the basis of the first composite signal generated by the first combination unit.

(11) The image processing apparatus according to (10), in which
the tap selection unit determines the tap as the reference region on the basis of correspondence data between a tap most suitable for a process of improving quality of the far-infrared image and the first composite signal, the correspondence data being acquired by a learning process.

(12) The image processing apparatus according to (1), in which
the multiple reference images are a visible image and a short-wave infrared image.

(13) The image processing apparatus according to (12), in which
the second combination unit performs the process of combining the far-infrared image and the first composite signal, using a second combination ratio determined on the basis of an amount of correlation between the far-infrared image and the short-wave infrared image and an amount of correlation between the short-wave infrared image and the visible image, to generate a quality-improved image of the far-infrared image.

(14) The image processing apparatus according to (13), in which
the second combination ratio is set such that, as the amount of correlation between the far-infrared image and the short-wave infrared image becomes larger, a contribution ratio of the first composite signal to a composite image generated by the second combination unit becomes higher.

(15) The image processing apparatus according to any one of (12) to (14), in which
the first combination unit performs a process of combining the visible image and the short-wave infrared image in accordance with an image combination algorithm for maximizing visibility to generate the first composite signal.

(16) The image processing apparatus according to any one of (13) to (15), further including:

a low-pass filter that reduces a resolution of the visible image and the short-wave infrared image which are the reference images to a resolution level of the far-infrared image which is an image to be corrected; and a correlation amount calculation unit that calculates an amount of correlation between a resolution-reduced visible image generated by applying the low-pass filter and the far-infrared image and an amount of correlation between the resolution-reduced visible image and a resolution-reduced short-wave infrared image generated by applying the low-pass filter.

(17) The image processing apparatus according to (16), in which the correlation amount calculation unit calculates the amount of correlation for each local region of the image, and the second combination unit performs the process of combining the far-infrared image and the first composite signal in units of the local regions in accordance with a combination ratio for each local region which is determined on the basis of the amount of correlation for each local region calculated by the correlation amount calculation unit to generate the quality-improved image of the far-infrared image.

(18) An image processing method performed in an image processing apparatus, the method including:

a step of inputting a far-infrared image and multiple reference images obtained by capturing the same object as that of the far-infrared image;

a first composite signal generation step of allowing a first combination unit to generate a first composite signal which is a composite signal of the multiple reference images; and a step of allowing a second combination unit to perform a process of combining the far-infrared image and the first composite signal to generate a quality-improved image of the far-infrared image.

(19) A program that causes an image processing apparatus to perform image processing and to perform:

a step of inputting a far-infrared image and multiple reference images obtained by capturing the same object as that of the far-infrared image;

a first composite signal generation step of allowing a first combination unit to generate a first composite signal which is a composite signal of the multiple reference images; and a step of allowing a second combination unit to perform a process of combining the far-infrared image and the first composite signal to generate a quality-improved image of the far-infrared image.

In addition, a series of processes described in the specification may be implemented by hardware, software, or a combination thereof. In a case in which the processes are implemented by software, a program having a processing sequence recorded thereon may be installed in a memory of a computer incorporated into dedicated hardware and then executed, or the program may be installed in a general-purpose computer capable of performing various processes and then executed. For example, the program may be recorded on a recording medium in advance. The program may be installed from the recording medium to the computer. Alternatively, the program may be received by the computer through a network, such as a local area network (LAN) or the Internet, and then installed in a recording medium, such as a hard disk drive, provided in the computer.

Note that the various processes described in the specification are not only performed in time series in accordance with the description, but also may be performed in parallel or individually in accordance with the processing capability of the apparatus performing the processes or if needed. Further, in the specification, the system is a logical set configuration of multiple apparatuses and is not limited to the configuration in which the apparatuses are provided in the same housing.

INDUSTRIAL APPLICABILITY

As described above, in accordance with the configuration of an embodiment of the present disclosure, an apparatus and a method that perform a process of improving the quality of a far-infrared image are achieved.

Specifically, for example, an image processing apparatus includes: a first combination unit that receives a far-infrared image and multiple reference images obtained by capturing the same object as that of the far-infrared image and generates a first composite signal which is a composite signal of the multiple reference images; and a second combination unit that performs a process of combining the far-infrared image and the first composite signal to generate a quality-improved image of the far-infrared image. The reference images are, for example, a visible image and a near-infrared image. The first combination unit generates the first composite signal on the basis of a visible image-far-infrared image correlation amount and a near-infrared image-far-infrared image correlation amount. The first combination unit sets a contribution ratio of a reference image, which has a larger amount of correlation with the far-infrared image, of the two reference images, that is, the visible image and the near-infrared image to a large value and generates the first composite signal.

An apparatus and a method that perform a process of improving the quality of a far-infrared image are achieved by these processes.

REFERENCE SIGNS LIST 10 visible image
20 near-infrared image
30 short-wave infrared image
40 far-infrared image
50 image processing unit
100 image processing apparatus
101 control unit
102 storage unit
103 codec
104 input unit
105 output unit
106 imaging unit
107 infrared imaging unit
108 visible imaging unit
111 far-infrared imaging unit
112 near-infrared imaging unit
113 visible imaging unit
120 image processing unit
201, 301 image positioning unit
202, 302 low-pass filter (LPF)
203, 303 correlation amount calculation unit
204 first combination ratio calculation unit
205, 305 first combination unit
206, 306 second combination unit
231 tap selection unit
232 correction parameter (coefficient) calculation unit
233 image correction unit
271 learning processing unit
304 second combination ratio calculation unit 501 CPU
502 ROM
503 RAM
504 bus
505 input/output interface
506 input unit
507 output unit
508 storage unit
509 communication unit
510 drive
511 removable medium
521 imaging unit
522 display unit

The invention claimed is:

1. An image processing apparatus, comprising:
a first combination unit configured to:
receive a far-infrared image of an object, a visible image of the object, and a near-infrared image of the object;
generate a composite signal based on
a first amount of correlation between the visible image and the far-infrared image, and
a second amount of correlation between the near-infrared image and the far-infrared image; and
set a contribution ratio of one of the visible image or the near-infrared image to a specific value, wherein the contribution ratio is set to one of the visible image or the near-infrared image which has a larger amount of correlation among the first amount of correlation and the second amount of correlation; and
a second combination unit configured to combine the far-infrared image and the composite signal to generate a quality-improved image of the far-infrared image.

2. The image processing apparatus according to claim 1, further comprising:
a low-pass filter configured to reduce a resolution of the visible image and the near-infrared image with respect to a resolution level of the far-infrared image which is an image to be corrected; and
a correlation amount calculation unit configured to calculate
a third amount of correlation between the resolution-reduced visible image and the far-infrared image, and
a fourth amount of correlation between the resolution-reduced near-infrared image and the far-infrared image,
wherein the first combination unit is further configured to combine the visible image and the near-infrared image based on a first combination ratio determined based on the third amount of correlation and the fourth amount of correlation, to generate the composite signal.

3. The image processing apparatus according to claim 2, wherein
the correlation amount calculation unit is further configured to calculate an amount of correlation for each local region of the visible image and the near-infrared image,
the first combination unit is further configured to combine the visible image and the near-infrared image in units of local regions based on a second combination ratio for each local region, to generate the composite signal, and
the second combination ratio of each local region is based on the amount of correlation for each local region.

4. The image processing apparatus according to claim 2, wherein
the correlation amount calculation unit is configured to calculate zero mean normalized cross correlation (ZNCC).

5. The image processing apparatus according to claim 1, wherein the second combination unit includes:
a tap selection unit configured to determine a tap as a reference region used to correct a pixel value of the far-infrared image;
a correction parameter calculation unit configured to determine a correction parameter used to correct the pixel value of the far-infrared image; and
an image correction unit configured to correct the pixel value of the far-infrared image based on the determined tap and the determined correction parameter.

6. The image processing apparatus according to claim 5, wherein the correction parameter calculation unit is further configured to determine the correction parameter based on the composite signal.

7. The image processing apparatus according to claim 6, wherein
the correction parameter calculation unit is further configured to determine the correction parameter based on correspondence data between the correction parameter most suitable for a process of improvement of quality of the far-infrared image and the composite signal, and
the correspondence data is based on a learning process.

8. The image processing apparatus according to claim 5, wherein the tap selection unit is further configured to determine the tap as the reference region based on the composite signal.

9. The image processing apparatus according to claim 8, wherein
the tap selection unit is further configured to determine the tap as the reference region based on correspondence data between the tap most suitable for a process of improving quality of the far-infrared image and the composite signal, and
the correspondence data is based on a learning process.

10. An image processing apparatus, comprising:
a first combination unit configured to:
receive a far-infrared image of an object, a visible image of the object, and a short-wave infrared image of the object; and
generate a composite signal of the visible image and the short-wave infrared image;
a second combination unit configured to combine the far-infrared image and the composite signal to generate a quality-improved image of the far-infrared image, based on a first combination ratio,
wherein the first combination ratio is based on a first amount of correlation between the far-infrared image and the short-wave infrared image and a second amount of correlation between the short-wave infrared image and the visible image.

11. The image processing apparatus according to claim 10, wherein the first combination ratio is set such that, as the first amount of correlation between the far-infrared image and the short-wave infrared image becomes larger, a contribution ratio of the composite signal to a composite image generated by the second combination unit becomes higher.

12. The image processing apparatus according to claim 10, wherein the first combination unit is configured to combine the visible image and the short-wave infrared image based on an image combination algorithm to maximize visibility to generate the composite signal.

13. The image processing apparatus according to claim 10, further comprising:

a low-pass filter configured to reduce a resolution of the visible image and the short-wave infrared image with respect to a resolution level of the far-infrared image which is an image to be corrected; and a correlation amount calculation unit configured to calculate a third amount of correlation between the resolution-reduced visible image and the far-infrared image, and a fourth amount of correlation between the resolution-reduced visible image and the resolution-reduced short-wave infrared image.

14. The image processing apparatus according to claim 13, wherein the correlation amount calculation unit is further configured to calculate a fifth amount of correlation for each local region of the visible image and the short-wave infrared image, the second combination unit configured to combine the far-infrared image and the composite signal in units of local regions based on a second combination ratio for each local region, and the second combination ratio for each local region is based on the fifth amount of correlation for each local region to generate the quality-improved image of the far-infrared image.

15. An image processing method, comprising:

in an image processing apparatus:

inputting a far-infrared image of an object, a visible image of the object, and a near-infrared image of the object;

generating a composite signal based on an amount of correlation between the visible image and the far-infrared image, and an amount of correlation between the near-infrared image and the far-infrared image;

setting a contribution ratio of one of the visible image or the near-infrared image to a specific value, wherein the contribution ratio is set to one of the visible image or the near-infrared image which has a larger amount of correlation among the first amount of correlation and the second amount of correlation; and combining the far-infrared image and the composite signal to generate a quality-improved image of the far-infrared image.

16. A non-transitory computer-readable medium having stored thereon computer-executable instructions which, when executed by a computer cause the computer to execute operations, the operations comprising:

inputting a far-infrared image of an object, a visible image of the object, and a near-infrared image of the object;

generating a composite signal based on an amount of correlation between the visible image and the far-infrared image, and an amount of correlation between the near-infrared image and the far-infrared image;

setting a contribution ratio of one of the visible image or the near-infrared image to a specific value, wherein the contribution ratio is set to one of the visible image or the near-infrared image which has a larger amount of correlation among the first amount of correlation and the second amount of correlation; and combining the far-infrared image and the composite signal to generate a quality-improved image of the far-infrared image.

* * * * *